US010906376B2

(12) United States Patent
Enomoto et al.

(10) Patent No.: US 10,906,376 B2
(45) Date of Patent: Feb. 2, 2021

(54) THERMAL MANAGEMENT SYSTEM FOR VEHICLE

(71) Applicant: DENSO CORPORATION, Kariya (JP)

(72) Inventors: Norihiko Enomoto, Kariya (JP); Nobuharu Kakehashi, Kariya (JP); Yasumitsu Omi, Kariya (JP)

(73) Assignee: DENSO CORPORATION, Kariya (JP)

( * ) Notice: Subject to any disclaimer, the term of this patent is extended or adjusted under 35 U.S.C. 154(b) by 167 days.

(21) Appl. No.: 15/541,305

(22) PCT Filed: Jan. 26, 2016

(86) PCT No.: PCT/JP2016/000370
§ 371 (c)(1),
(2) Date: Jun. 30, 2017

(87) PCT Pub. No.: WO2016/125452
PCT Pub. Date: Aug. 11, 2016

(65) Prior Publication Data
US 2018/0264913 A1 Sep. 20, 2018

(30) Foreign Application Priority Data
Feb. 6, 2015 (JP) ................................ 2015-022087

(51) Int. Cl.
*B60H 1/00* (2006.01)
*B60L 58/27* (2019.01)
(Continued)

(52) U.S. Cl.
CPC ..... *B60H 1/00899* (2013.01); *B60H 1/32284* (2019.05); *B60L 58/27* (2019.02);
(Continued)

(58) Field of Classification Search
CPC ............ B60H 1/00899; B60H 1/32284; B60L 11/1875; F01P 7/161; F01P 9/06
(Continued)

(56) References Cited

U.S. PATENT DOCUMENTS 6,047,770 A * 4/2000 Suzuki ............... B60H 1/00007
165/202
6,640,889 B1 * 11/2003 Harte .................. B60H 1/00885
165/202
(Continued)

FOREIGN PATENT DOCUMENTS

JP 3244467 B2 1/2002
JP 2004501021 A 1/2004
(Continued)

*Primary Examiner* — Tho V Duong
*Assistant Examiner* — Raheena R Malik
(74) *Attorney, Agent, or Firm* — Harness, Dickey & Pierce, P.L.C.

(57) ABSTRACT

A thermal management system for a vehicle includes an engine cooling circuit that causes a heat medium to circulate through an engine, and an engine radiator that exchanges heat between the heat medium in the engine cooling circuit and outside air. The thermal management system for a vehicle further includes a switching device that switches between an independent mode in which the heat medium circulates respectively independently through a cooler cooling circuit and the engine cooling circuit, and a communication mode in which the cooler cooling circuit and the engine cooling circuit communicate with each other to cause the heat medium to flow between a chiller and the engine radiator; and a controller that controls an operation of the switching device to switch to the communication mode when a temperature of the heat medium in the engine cooling circuit is lower than a first heat-medium temperature.

20 Claims, 17 Drawing Sheets

(51) Int. Cl.
  *B60H 1/32*   (2006.01)
  *F01P 7/16*   (2006.01)
  *F01P 9/06*   (2006.01)

(52) U.S. Cl.
  CPC .............. *F01P 7/161* (2013.01); *F01P 9/06*
      (2013.01); *B60L 2240/525* (2013.01); *B60L 2240/545* (2013.01)

(58) Field of Classification Search
  USPC ........................................................ 165/202
  See application file for complete search history.

(56) References Cited

U.S. PATENT DOCUMENTS

| | | | | |
|---|---|---|---|---|
| 6,928,831 | B2* | 8/2005 | Heyl | B60H 1/00907 62/159 |
| 7,182,129 | B2* | 2/2007 | Karl | B60H 1/00007 165/202 |
| 8,607,855 | B2* | 12/2013 | Feuerecker | B60H 1/00907 165/202 |
| 9,796,241 | B2* | 10/2017 | Takeuchi | B60L 1/02 |
| 2004/0089003 | A1 | 5/2004 | Amaral et al. | |
| 2005/0039878 | A1* | 2/2005 | Meyer | B60H 1/00878 165/42 |
| 2006/0137388 | A1* | 6/2006 | Kakehashi | B60H 1/323 62/513 |
| 2011/0048671 | A1* | 3/2011 | Nishikawa | B60H 1/00885 165/42 |
| 2011/0197611 | A1* | 8/2011 | Hall | B60H 1/00378 62/238.7 |
| 2012/0174602 | A1* | 7/2012 | Olivier | B60H 1/004 62/79 |
| 2014/0041826 | A1* | 2/2014 | Takeuchi | B60L 1/02 165/10 |
| 2015/0128632 | A1* | 5/2015 | Kishita | B60L 11/1875 62/324.6 |
| 2015/0314669 | A1* | 11/2015 | Noda | F25B 25/005 62/324.1 |
| 2016/0001635 | A1* | 1/2016 | Noda | B60H 1/00921 62/160 |
| 2016/0082805 | A1* | 3/2016 | Graaf | B60H 1/00899 165/202 |
| 2016/0137031 | A1* | 5/2016 | Noda | B60H 1/03 165/203 |
| 2016/0153343 | A1 | 6/2016 | Kakehashi et al. | |
| 2016/0159199 | A1* | 6/2016 | Kuroda | F25B 5/04 165/202 |
| 2016/0214461 | A1* | 7/2016 | Kuroda | B60H 1/00885 |
| 2017/0182866 | A1* | 6/2017 | Onishi | B60H 1/00778 |
| 2018/0208019 | A1* | 7/2018 | Sugimura | F01P 3/20 |
| 2018/0361828 | A1* | 12/2018 | Kato | B60H 1/321 |

FOREIGN PATENT DOCUMENTS

| | | |
|---|---|---|
| JP | 2014181594 A | 9/2014 |
| WO | WO-2011015426 A1 | 2/2011 |

\* cited by examiner

FIG. 8

| VALVE POSITION<br>AIR-CONDITIONING MODE<br>FLOW-PATH CONNECTING DESTINATION | C-1<br>・AIR-COOLING<br>・DEHUMIDIFICATION HEATING<br>・HEAT-PUMP REHEAT DEHUMIDIFICATION HEATING | C-2<br>・OUTSIDE-AIR HEAT-ABSORPTION TYPE HEAT-PUMP AIR-HEATING | C-3<br>・OUTSIDE-AIR HEAT-ABSORPTION TYPE HEAT-PUMP AIR-HEATING (WITH ENGINE EXHAUST-HEAT ASSIST) | C-4<br>・ENGINE HEAT-ABSORPTION TYPE HEAT-PUMP AIR-HEATING | C-5<br>・OUTSIDE-AIR USAGE DEHUMIDIFICATION |
|---|---|---|---|---|---|
| COOLER-CORE FLOW PATH | CHILLER FLOW PATH | INTERRUPTION | CHILLER FLOW PATH (FULLY OPENED) | INTERRUPTION | CHILLER FLOW PATH (FULLY OPENED) |
| ENGINE-RADIATOR FLOW PATH | INTERRUPTION | CHILLER FLOW PATH | CHILLER FLOW PATH (FLOW-RATE ADJUSTMENT) | INTERRUPTION | CHILLER FLOW PATH (FULLY OPENED) |
| ENGINE HEAT-ABSORPTION FLOW PATH | INTERRUPTION | INTERRUPTION | INTERRUPTION | CHILLER FLOW PATH | INTERRUPTION |

FIG. 9

| VALVE POSITION<br>OPERATION MODE / FLOW-PATH CONNECTING DESTINATION | H-1 | | H-2 | H-3 |
|---|---|---|---|---|
| OPERATION MODE | ·AIR-COOLING | ·AIR-COOLING (ADJUSTMENT OF AIR MIX BLOWING TEMPERATURE)<br><br>·DEHUMIDIFICATION HEATING | ·HEATER CORE AIR-HEATING USING ENGINE EXHAUST HEAT | ·HEAT-PUMP AIR-HEATING | ·OUTSIDE-AIR HEAT-ABSORPTION TYPE HEAT-PUMP AIR-HEATING (WITH ENGINE EXHAUST-HEAT ASSIST)<br><br>·ENGINE-DEVICE HEATING<br><br>·HEAT-PUMP REHEAT DEHUMIDIFICATION AIR-HEATING |
| RADIATOR INLET FLOW PATH | CONDENSER FLOW PATH | CONDENSER FLOW PATH | CONDENSER FLOW PATH | INTERRUPTION | INTERRUPTION |
| HEATER-CORE FLOW PATH | SHORT LOOP CIRCUIT (HEATER PUMP STOPPED) | SHORT LOOP CIRCUIT (HEATER-PUMP OPERATION) | SHORT LOOP CIRCUIT (HEATER-PUMP OPERATION) | CONDENSER FLOW PATH | CONDENSER FLOW-PATH & COOLANT-COOLANT HEAT EXCHANGER FLOW PATH |

THERMAL MANAGEMENT SYSTEM FOR VEHICLE

CROSS REFERENCE TO RELATED APPLICATIONS

This application is a U.S. National Phase Application under 35 U.S.C. 371 of International Application No. PCT/JP2016/000370 filed on Jan. 26, 2016 and published in Japanese as WO 2016/125452 A1 on Aug. 11, 2016. This application is based on and claims the benefit of priority from Japanese Patent Application No. 2015-022087 filed on Feb. 6, 2015. The entire disclosures of all of the above applications are incorporated herein by reference.

FIELD OF THE INVENTION

The present disclosure relates to a thermal management system for use in vehicles.

BACKGROUND ART

Conventionally, Patent Document 1 describes a thermal management system for vehicles that performs air-cooling of the vehicle interior using cold heat held in a low-pressure side refrigerant within a refrigeration cycle and air-heating of the vehicle interior using hot heat held in an engine coolant (hot water).

In the above related art, an engine radiator is disposed in an engine cooling circuit through which the engine coolant circulates. The engine radiator is a heat-dissipation heat exchanger that exchanges heat between the engine coolant and the outside air, thereby dissipating the heat from the engine coolant into the outside air.

The above related art provides a coolant circuit on a low-temperature side to circulate the coolant cooled by a low-pressure side refrigerant in the refrigeration cycle. In the low-temperature side coolant circuit, a cooler core is disposed. The cooler core is an air cooling heat exchanger that exchanges heat between the coolant cooled by the low-pressure side refrigerant in the refrigeration cycle and the air to be blown into the vehicle interior, thereby cooling the ventilation air in the vehicle interior.

With the above-mentioned configuration, however, the air-heating using the engine coolant cannot be performed when the temperature of the engine coolant is low, for example, during stopping or warming up of the engine.

The thermal management system in the related art is designed to enable air-heating of the vehicle interior by pumping heat from the outside air via a heat-pump operation in the refrigeration cycle. Specifically, the thermal management system has a heat-absorption heat exchanger and an air heater.

The heat-absorption heat exchanger is a heat exchanger that exchanges heat between the outside air and the coolant in the low-temperature side coolant circuit, thereby absorbing heat from the outside air into the coolant. The air heater is a device that heats the air to be blown into the vehicle interior by using hot heat held in high-pressure side refrigerant within the refrigeration cycle.

RELATED ART DOCUMENT

Patent Document

[Patent Document 1] Japanese Unexamined Patent Application Publication No. 2014-181594

SUMMARY OF INVENTION

The thermal management system in the related art includes the engine radiator and the heat-absorption heat exchanger, which serve as a heat exchanger to exchange heat with the outside air. However, based on the studies conducted by the inventors, the heat-absorption heat exchanger is used alone in the related art when the temperature of the engine coolant is so low that the air-heating of the vehicle interior is executed only by absorbing heat from the outside air, while in contrast the engine radiator is not used and thus might become useless.

Since not only the engine radiator, but also the heat-absorption heat exchanger needs to be mounted on a vehicle as the heat exchanger to exchange heat with the outside air, the body of the heat-absorption heat exchanger is required to be downsized in terms of restrictions on vehicle mounting spaces. Such downsizing reduces the heat exchange performance of the heat-absorption heat exchanger, and thereby degrades the air-heating performance for the vehicle interior.

The present disclosure has been made in view of the foregoing matters, and it is an object of the present disclosure to provide a thermal management system for a vehicle, which has improved air-heating performance for the vehicle interior by effectively utilizing an engine radiator.

A thermal management system for a vehicle according to an aspect of the present disclosure includes a compressor that draws and discharges a refrigerant in a refrigeration cycle, an air heater that heats air to be blown into a vehicle interior by using heat of a high-pressure side refrigerant in the refrigeration cycle, and a chiller that cools a heat medium by exchanging heat between a low-pressure side refrigerant in the refrigeration cycle and the heat medium. Thermal management system for a vehicle further includes a cooler core that cools the air by exchanging heat between the air and the heat medium cooled by the chiller, and a cooler cooling circuit that causes the heat medium to circulate through the chiller and the cooler core. Thermal management system for a vehicle is provided with a cooler pump that draws and discharges the heat medium in the cooler cooling circuit, an engine cooling circuit that causes the heat medium to circulate through an engine, an engine pump that draws and discharges the heat medium in the engine cooling circuit, and an engine radiator that exchanges heat between the heat medium in the engine cooling circuit and outside air. Furthermore, the thermal management system for a vehicle includes a switching device that switches between an independent mode in which the heat medium circulates respectively independently through the cooler cooling circuit and the engine cooling circuit, and a communication mode in which the cooler cooling circuit and the engine cooling circuit communicate with each other to cause the heat medium to flow between the chiller and the engine radiator. In addition, the thermal management system for a vehicle is provided with a controller that controls an operation of the switching device to switch to the communication mode when a temperature of the heat medium in the engine cooling circuit is lower than a first heat-medium temperature.

Thus, when the temperature of the heat medium in the engine cooling circuit is low, the thermal management system is switched to the communication mode, causing the heat medium cooled by the chiller to flow to the engine radiator in the engine cooling circuit. In this way, the air-heating of the vehicle interior can be performed with the heat absorbed from the outside air in the engine radiator.

Consequently, the engine radiator can be effectively utilized to improve the air-heating performance of the vehicle interior.

BRIEF DESCRIPTION OF DRAWINGS

FIG. 8 is a diagram showing valve positions of a cooler-side valve in the first embodiment.

FIG. 9 is a diagram showing valve positions of a heater-side valve in the first embodiment.

DESCRIPTION OF EMBODIMENTS

Figure 1:
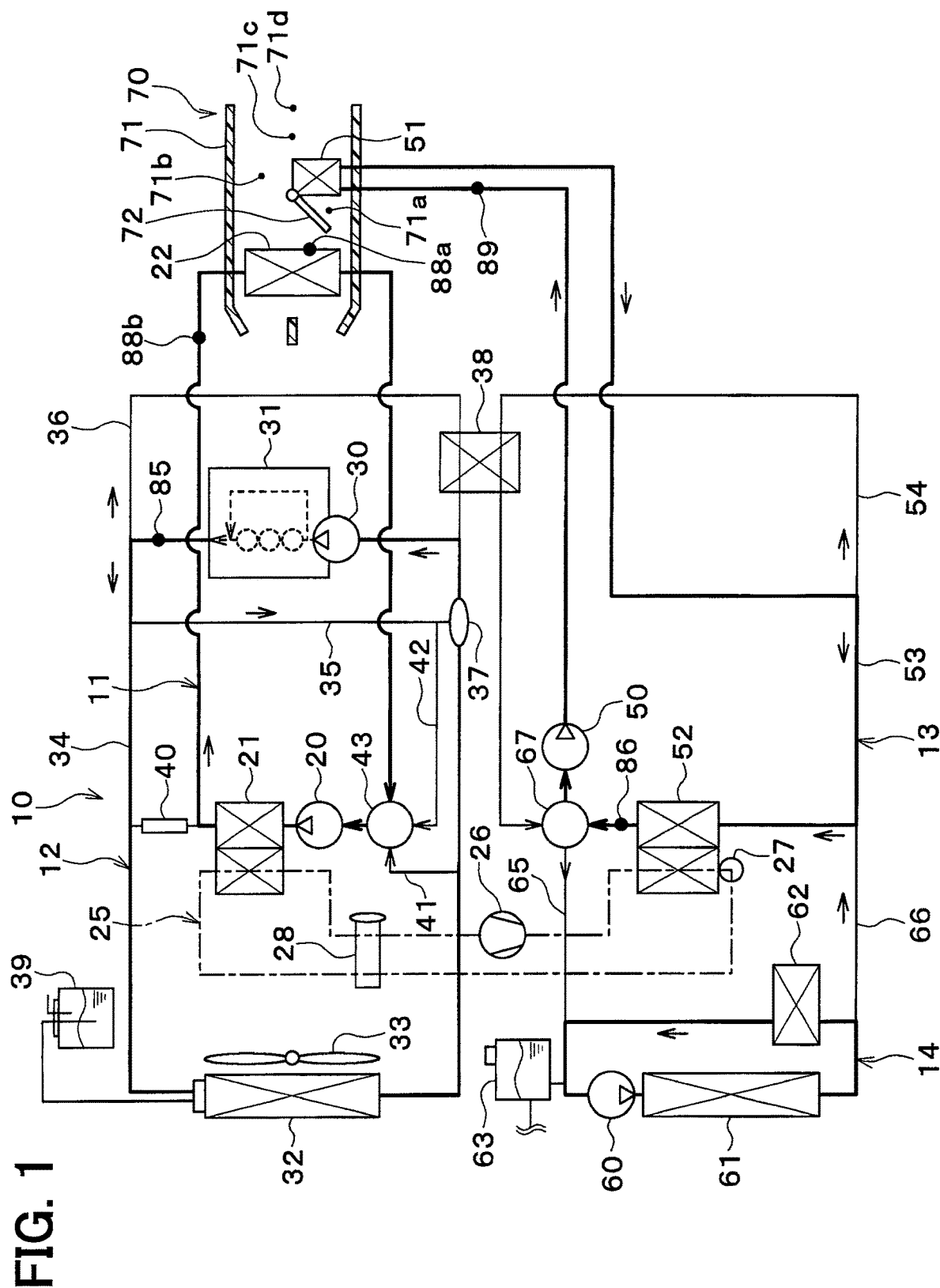
FIG. 1 is an entire configuration diagram of a vehicle thermal management system in a first embodiment of the present disclosure.

In the following, a plurality of embodiments for implementing the present disclosure will be described with reference to the accompanying drawings. Parts in each embodiment corresponding to the contents described in the previous embodiments are given by the same reference characters and thus some redundant descriptions will be omitted. When only a part of a structure is explained in each embodiment, other parts of the structure can be understood by applying other previous embodiments thereto. In addition to a combination of parts in the respective embodiments that are clearly described to be capable of being specifically combined, some embodiments can also be partly combined together as long as their combinations are not problematic, unless otherwise specified.

First Embodiment

A vehicle thermal management system 10 shown in FIG. 1 is used to adjust various devices mounted on a vehicle or an interior of the vehicle to an appropriate temperature. In this embodiment, the vehicle thermal management system 10 is applied to a hybrid vehicle that can obtain a vehicle-travel driving force from both an engine (internal combustion engine) and a traveling electric motor.

The hybrid vehicle in this embodiment is configured as a plug-in hybrid vehicle that can charge the battery (vehicle-mounted battery) mounted on the vehicle, with power supplied from an external power source (commercial power source) during stopping of the vehicle. For example, a lithium ion battery can be used as the battery.

The driving force output from the engine is used not only to cause the vehicle to travel, but also to operate a power generator. The power generated by the power generator and the power supplied from an external power source can be stored in the battery. The power stored in the battery is supplied not only to the traveling electric motor, but also to various vehicle-mounted devices, including electric components configuring the vehicle thermal management system 10.

The vehicle thermal management system 10 includes a cooler cooling circuit 11, an engine cooling circuit 12, a condenser circuit 13, and a radiator circuit 14. The cooler cooling circuit 11 and the engine cooling circuit 12 are coolant circuits through which the coolant (heat medium) circulates. The condenser circuit 13 and the radiator circuit 14 are coolant circuits through which the coolant (heater-side heat medium) circulates, independently of the cooler cooling circuit 11 and the engine cooling circuit 12.

The coolant is a fluid as the heat medium. In this embodiment, the coolant suitable for use includes a liquid containing at least ethylene glycol, dimethylpolysiloxane or a nanofluid, or an antifreezing fluid.

In the cooler cooling circuit 11, a cooler pump 20, a chiller 21, and a cooler core 22 are arranged to circulate the coolant therethrough in this order. The cooler pump 20 is an electric pump that draws and discharges the coolant.

The chiller 21 is a low-pressure side heat exchanger (heat-medium cooling heat exchanger) that cools a coolant by exchanging heat between the coolant and the low-pressure side refrigerant in a refrigeration cycle 25. The chiller 21 can cool the coolant to a temperature lower than the outside air temperature.

The cooler core 22 is an air cooling heat exchanger (heat-medium air heat exchanger) that cools ventilation air to be blown into the vehicle interior by exchanging heat between the coolant and the ventilation air into the vehicle interior. In the cooler core 22, the coolant undergoes sensible heat change to absorb heat from the air. That is, in the cooler core 22, the coolant does not change its phase and remains in the liquid phase even though the coolant absorbs heat from the air.

In the engine cooling circuit 12, an engine pump 30, an engine 31, and an engine radiator 32 are arranged to circulate the coolant therethrough in this order. The engine pump 30 is an electric pump that draws and discharges the coolant. The engine pump 30 may be a belt-driven pump that is driven by a driving force transferred from the engine 31 via a belt.

The engine radiator 32 is a coolant-outside air heat exchanger (heat medium-outside air heat exchanger) that exchanges heat between the coolant and the vehicle exterior air (hereinafter referred to as the "outside air"). An exterior blower 33 is an outside-air blower that blows the outside air to the engine radiator 32.

The engine cooling circuit 12 has a circulation flow path 34, a radiator bypass flow path 35, and a heat-exchanger flow path 36. The circulation flow path 34 is a coolant flow path in which the engine pump 30, the engine 31, and the engine radiator 32 are arranged to circulate the coolant therethrough in this order.

The radiator bypass flow path 35 is a coolant flow path that is connected to the circulation flow path 34 to allow the coolant to flow therethrough while bypassing the engine radiator 32. The radiator bypass flow path 35 is disposed in parallel with the engine radiator 32 with respect to the coolant flow.

A thermostat 37 is disposed in a connection portion between the circulation flow path 34 and the radiator bypass flow path 35. The thermostat 37 is a coolant-temperature responsive valve that is constructed of a mechanical mechanism designed to open and close a coolant flow path by displacing a valve body using a thermo wax (temperature sensing member) that has its volume changeable depending on its temperature.

Specifically, the thermostat 37 opens the radiator bypass flow path 35, while closing the flow path on a side of the engine radiator 32 when the coolant temperature is below a predetermined temperature (e.g., 70° C.).

On the other hand, the thermostat 37 closes the radiator bypass flow path 35, while opening the flow path on a side of the engine radiator 32 when the coolant temperature is above the predetermined temperature (e.g., 70° C.).

The heat-exchanger flow path 36 is a coolant flow path that is provided with a coolant-coolant heat exchanger (heat transfer device) 38. The heat-exchanger flow path 36 is arranged in parallel with the engine radiator 32 and the radiator bypass flow path 35 with respect to the coolant flow.

The coolant-coolant heat exchanger 38 is a heat exchanger (heat-medium heat-medium heat exchanger) that exchanges heat between the coolant in the engine cooling circuit 12 and the coolant in the condenser circuit 13.

A first reserve tank 39 is connected to the engine radiator 32. The first reserve tank 39 is a coolant reservoir that stores therein excess coolant.

A communication flow path 40, an engine-radiator flow path 41, and an engine heat-absorption flow path 42 are coolant flow paths that communicate the cooler cooling circuit 11 with the engine cooling circuit 12.

The communication flow path 40 couples a part of the cooler cooling circuit 11 located on the coolant outlet side of the chiller 21 and on the coolant inlet side of the cooler core 2 to a part of the engine cooling circuit 12 located on the coolant outlet side of the engine 31 and on the coolant inlet side of the engine radiator 32.

The engine-radiator flow path 41 couples a part of the cooler cooling circuit 11 located on the coolant outlet side of the cooler core 22 and on the coolant suction side of the cooler pump 20 to a part of the engine cooling circuit 12 located on the coolant outlet side of the engine radiator 32 and on the coolant suction side of the engine pump 30.

The engine heat-absorption flow path 42 couples a part of the cooler cooling circuit 11 located on the coolant outlet side of the cooler core 22 and the coolant suction side of the cooler pump 20 to the radiator bypass flow path 35 in the engine cooling circuit 12.

A cooler-side valve 43 is disposed in a connection portion among the coolant flow path of the cooler cooling circuit 11, the engine-radiator flow path 41, and the engine heat-absorption flow path 42. The cooler-side valve 43 is a four-way valve that has four ports (first to fourth ports).

The first port of the cooler-side valve 43 is connected to the flow path on the coolant outlet side of the cooler core 22. The second port of the cooler-side valve 43 is connected to the flow path on the coolant suction side of the cooler pump 20. In other words, the second port of the cooler-side valve 43 is connected to the flow path on the coolant inlet side of the chiller 21.

The third port of the cooler-side valve 43 is connected to the engine-radiator flow path 41. The fourth port of the cooler-side valve 43 is connected to the engine heat-absorption flow path 42.

The cooler-side valve 43 has a valve body that switches connection states among the first to fourth ports. The cooler-side valve 43 is a coolant-flow switching portion (switching device) that switches the flow of the coolant by a switching operation of the valve body.

The condenser circuit 13 has a heater pump 50, a heater core (air heater) 51, and a condenser (air heater) 52. The heater pump 50 is an electric pump that draws and discharges the coolant.

The heater core 51 is an air heating heat exchanger (heat-medium air heat exchanger) that heats ventilation air to be blown into the vehicle interior by exchanging heat between the coolant and the ventilation air into the vehicle interior. In the heater core 51, the coolant undergoes sensible heat change to dissipate heat into the air. That is, in the heater core 51, the coolant does not change its phase and remains in the liquid phase even though the coolant dissipates heat into the air.

A condenser 52 is a high-pressure side heat exchanger (heat-medium heating heat exchanger) that heats the coolant by exchanging heat between the coolant and the high-pressure side refrigerant in the refrigeration cycle 25.

Each of the heater core 51 and the condenser 52 serves as an air heater that heats the air to be blown into the vehicle interior by using heat of the high-pressure side refrigerant in the refrigeration cycle 25.

The refrigeration cycle 25 is a vapor-compression refrigerator that includes a compressor 26, the condenser 52, a receiver 27, an expansion valve 28, and the chiller 21. The refrigeration cycle 25 in this embodiment forms a subcritical refrigeration cycle in which a high-pressure side refrigerant pressure does not exceed the critical pressure of the refrigerant, using a fluorocarbon refrigerant as the refrigerant.

The compressor 26 is an electric compressor driven by power supplied from a battery, or a variable displacement compressor driven by an engine belt while being supplied with the driving force from the engine. The compressor 26 draws, compresses, and discharges the refrigerant in the refrigeration cycle 25.

The condenser 52 is a condensing device that condenses a high-pressure side refrigerant discharged from the compressor 26 by exchanging heat between the high-pressure side refrigerant and the coolant. The receiver 27 is a gas-liquid separator that separates a gas-liquid two-phase refrigerant flowing out of the capacitor 52 into a gas-phase refrigerant and a liquid-phase refrigerant, and then causes the liquid-phase refrigerant obtained by the separation to flow toward an expansion valve 23.

The expansion valve 28 is a decompression portion (decompression device) that decompresses and expands the liquid-phase refrigerant flowing out of the receiver 27. The expansion valve 28 is a thermal expansion valve that has a thermo-sensitive portion for detecting the superheat degree of the refrigerant on the outlet side of the chiller 21 based on the temperature and pressure of the refrigerant on the outlet side of the chiller 21. The expansion valve 28 is a thermal expansion valve that adjusts a throttle passage area by a mechanical mechanism such that the superheat degree of the refrigerant on the outlet side of the chiller 21 is within a predetermined range previously set. The expansion valve 28 may be an electric expansion valve that adjusts the throttle passage area by an electric mechanism.

The chiller 21 is an evaporator that evaporates a low-pressure refrigerant decompressed and expanded by the expansion valve 28 by exchanging heat between the low-pressure refrigerant and the coolant. The gas-phase refrigerant evaporated at the chiller 21 is drawn into and compressed by the compressor 26.

Each of the compressor 26 and the expansion valve 28 serves as a refrigerant flow-rate adjustment portion (refrigerant flow-rate adjuster) that adjusts the flow rate of refrigerant flowing through the refrigeration cycle 25.

The condenser circuit 13 has a circulation flow path 53 and a coolant-coolant heat-exchanger flow path 54. The circulation flow path 53 is a coolant flow path in which the heater pump 50, the heater core 51, and the condenser 52 are arranged to circulate the coolant therethrough in this order.

The coolant-coolant heat-exchanger flow path 54 is a coolant flow path that is provided with the coolant-coolant heat exchanger 38. The coolant-coolant heat-exchanger flow path 54 is arranged in parallel with the condenser 52 with respect to the coolant flow. The coolant-coolant heat-exchanger flow path 54 is connected to a part of the circulation flow path 53 on the coolant outlet side of the heater core 51 and on the coolant inlet side of the condenser 52 and to another part of the circulation flow path 53 on the coolant outlet side of the condenser 52 and on the coolant suction side of the heater pump 50.

In the radiator circuit 14, a radiator pump 60, a heater-side radiator 61, and a coolant circulation device 62 are arranged to circulate the coolant therethrough in this order. The radiator pump 60 is an electric pump for drawing and discharging the coolant.

The heater-side radiator 61 is a coolant-outside air heat exchanger (heat medium-outside air heat exchanger) that exchanges heat between the coolant and the outside air. The heater-side radiator 61 receives the outside air blown by the exterior blower 33.

The heater-side radiator 61 and the engine radiator 32 are disposed at the forefront of the vehicle. The heater-side radiator 61 is disposed on the upstream side in the outside-air flow direction with respect to the engine radiator 32. During traveling the vehicle, traveling air is allowed to be received by the heater-side radiator 61 and the engine radiator 32.

The coolant circulation device 62 is a device to be cooled by the coolant flowing therethrough. Examples of the coolant circulation device 62 include a traveling motor, an inverter, an oil cooler, a turbocharger, and an intercooler.

The inverter is a power converter that converts a direct-current (DC) power supplied from the battery into an alternating-current (AC) power to output the AC power to the traveling motor.

The oil cooler is an engine oil heat exchanger (lubricating oil heat exchanger) that cools the engine oil by exchanging heat between the engine oil (lubricating oil for use in the engine 31) and the coolant.

The turbocharger is a supercharger that supercharges intake air of the engine 31 by rotating a turbine using residual energy in exhaust gas from the engine 31. The intercooler is an intake air cooler that cools a supercharged intake air by exchanging heat between the coolant and the supercharged intake air at a high temperature compressed by the turbocharger.

A second reserve tank 63 is connected to the radiator circuit 14. The second reserve tank 63 is a coolant reservoir that stores therein excess coolant.

A radiator inlet-side flow path 65 and a radiator outlet-side flow path 66 are coolant flow paths that communicate the condenser circuit 13 with the radiator circuit 14.

The radiator inlet-side flow path 65 connects a part of the circulation flow path 53 in the condenser circuit 13 on the coolant outlet side of the heater core 51 and on the coolant inlet side of the condenser 52 to a part of the radiator circuit 14 on the coolant outlet side of the coolant circulation device 62 and on the coolant suction side of the radiator pump 60.

The radiator outlet-side flow path 66 connects a part of the circulation flow path 53 in the condenser circuit 13 on the coolant outlet side of the condenser 52 and on the coolant suction side of the heater pump 50 to a part of the radiator circuit 14 on the coolant outlet side of the heater-side radiator 61 and on the coolant inlet side of the coolant circulation device 62.

A heater-side valve 67 is disposed in a connection portion among the circulation flow path 53 and the coolant-coolant heat-exchanger flow path 54 in the condenser circuit 13, and the radiator inlet-side flow path 65. The heater-side valve 67 is a four-way valve that has four ports (first to fourth ports).

The first port of the heater-side valve 67 is connected to the flow path on the coolant outlet side of the condenser 52. The second port of the heater-side valve 67 is connected to the flow path on the coolant suction side of the radiator pump 60. In other words, the second port of the heater-side valve 67 is connected to the flow path on the coolant inlet side of the heater core 51.

The third port of the heater-side valve 67 is connected to the coolant-coolant heat-exchanger flow path 54. The fourth port of the heater-side valve 67 is connected to the radiator inlet-side flow path 65.

The heater-side valve 67 has a valve body that switches connection states among the first to fourth ports. The heater-side valve 67 is a coolant-flow switching portion (heater-side switching device) that switches the flow of the coolant by a switching operation of the valve body.

The cooler core 22 and the heater core 51 are accommodated in a casing 71 of an interior air-conditioning unit 70 in the vehicle air conditioner. The interior air-conditioning unit 70 is disposed inside a dashboard (instrumental panel) at the foremost portion of the vehicle interior. The casing 71 forms an outer shell of the interior air-conditioning unit 70.

The casing 71 forms an air passage through which the air blown by an interior blower flows. The casing 71 is formed of resin (for example, polypropylene) with some elasticity and excellent strength.

The cooler core 22 and the heater core 51 are disposed in the air passage within the casing 71 to cause the air to flow therethrough in this order.

An inside/outside air switching case is disposed at the most upstream side of ventilation-air flow in the casing 71. The inside/outside air switching case is an inside/outside air switching portion (inside/outside air switching device) that switches between the vehicle interior air (hereinafter referred to as an "inside air") and the outside air to introduce the switched air into the vehicle interior.

The inside/outside air switching case switches an suction port mode to one of an inside-air circulation mode, an outside-air circulation mode, and an inside-outside air mixing mode. In the inside-air circulation mode, the inside air is introduced but the outside air is not introduced. In the outside-air circulation mode, the outside air is introduced but the inside air is not introduced. In the inside-outside air mixing mode, both the inside air and the outside air are introduced at a predetermined ratio.

On the air-flow downstream side of the cooler core 22 within the casing 71, a heater core passage 71a and a bypass passage 71b are formed in parallel with each other. The heater core passage 71a allows the air passing through the cooler core 22 to flow through the heater core 51. The bypass passage 71b allows the air passing through the cooler core 22 to flow while bypassing the heater core 51.

A mixing space 71c is formed on the air-flow downstream sides of the heater core passage 71a and the bypass passage 71b in the casing 71 so as to mix hot air flowing out of the heater core passage 71a with cold air flowing out of the bypass passage 71b.

An air mix door 72 is disposed on the air-flow downstream side of the cooler core 22 and on the inlet sides of the heater core passage 71a and the bypass passage 71b within the casing 71.

The air mix door 72 serves as an air-volume ratio adjustment portion (air-volume ratio adjuster) that continuously changes the ratio of the volume of the air flowing through the heater core passage 71a to that of the air flowing through the bypass passage 71b. The temperature of ventilation air mixed in the mixing space 71c is changed depending on the ratio of the volume of the air passing through the heater core passage 71a to that passing through the bypass passage 71b. Therefore, the air mix door 72 is a temperature adjustment portion (temperature adjuster) that adjusts the temperature of the air in the mixing space 71c (the temperature of the ventilation air to be blown into the vehicle interior).

The air mix door 72 is the so-called cantilever door that includes a rotary shaft driven by an electric actuator and a plate-shaped door main body coupled to the common rotary shaft.

Air outlets 71d are formed on the most downstream side of the air flow at the casing 71. The air outlets 71d blow the air having its temperature adjusted by the mixing space 71c, into the vehicle interior space which is a space to be air-conditioned.

The air outlets 71d include a face air outlet, a foot air outlet, and a defroster air outlet. The face air outlet is an upper-body side air outlet that blows the conditioned air toward the upper body of an occupant in the vehicle interior. The foot air outlet is a foot-side air outlet (lower-body side air outlet) that blows the conditioned air toward the feet (lower body) of the occupant. The defroster air outlet is a windowpane side air outlet that blows the conditioned air toward the inner surface of a windshield of the vehicle.

Air-outlet mode doors are disposed on the upstream sides of the air flow of the face air outlet, the foot air outlet, and the defroster air outlet. The air-outlet mode doors serve as an air-outlet mode switching portion (air-outlet mode switch) that switches the air-outlet mode by adjusting the opening areas of the face air outlet, the foot air outlet, and the defroster air outlet. The air-outlet mode doors are actuated and rotated by respective electric actuators (not shown).

The air-outlet modes include a face mode, a bi-level mode, a foot mode, a foot-defroster mode, and a defroster mode.

In the face mode, the face air outlet is fully opened to blow the air from the face air outlet toward the upper body of the occupant in the vehicle interior. In the bi-level mode, both the face air outlet and the foot air outlet are opened to blow air toward the upper body and feet of the occupant in the vehicle interior.

In the foot mode, the foot air outlet is fully opened with the defroster air outlet opened only by a small opening degree to blow the air mainly from the foot air outlet. In the foot-defroster mode, the foot air outlet and the defroster air outlet are opened by the same degree to blow the air from both the foot air outlet and the defroster air outlet.

In the defroster mode, the defroster air outlet is fully opened to blow the air from the defroster air outlet to the inner surface of the windshield of the vehicle.

Figure 2:
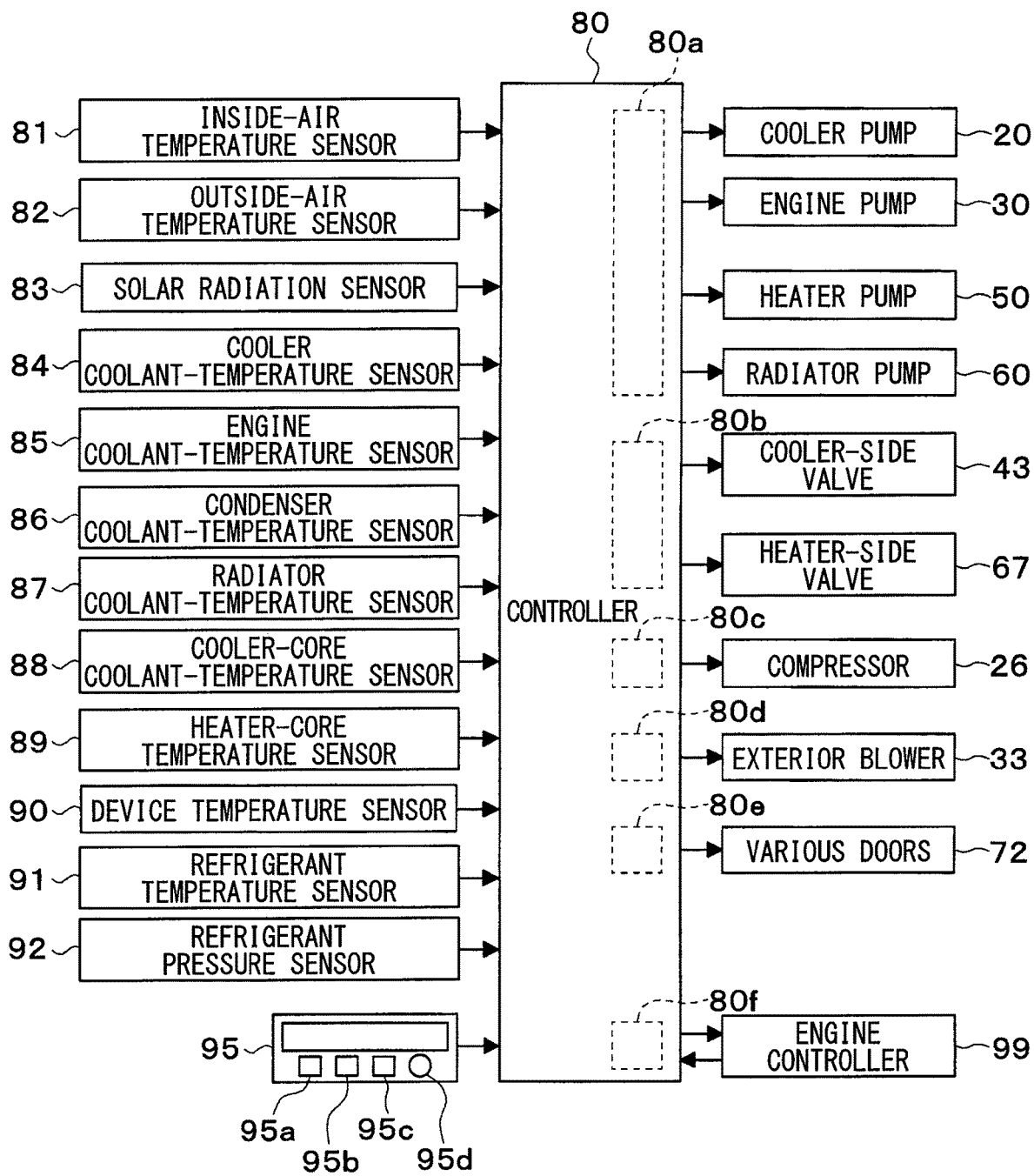
FIG. 2 is a block diagram showing an electric control unit of the vehicle thermal management system in the first embodiment.

Next, electric control units of the vehicle thermal management system 10 will be described with reference to FIG. 2. A controller 80 is configured of a known microcomputer, including a CPU, a ROM, and a RAM, and a peripheral circuit thereof. The controller 80 is a control unit that performs various computations and processing based on air-conditioning control programs stored in the ROM to thereby control the operations of various control target devices that are connected to its output side.

The control target devices to be controlled by the controller 80 include the cooler pump 20, the engine pump 30, the heater pump 50, the radiator pump 60, the cooler-side valve 43, the heater-side valve 67, the compressor 26, the exterior blower 33, and the electric actuators for driving various doors (air mix door 72 and the like) of the interior air-conditioning unit 70.

Structures (hardware and software) of the controller 80 that control the operations of the respective control target devices, which are connected to the output side of the controller 80, serve as respective control units for controlling the operations of the control target devices.

A pump control unit 80a of the controller 80 controls the operations of the cooler pump 20, the engine pump 30, the heater pump 50, and the radiator pump 60. The pump control unit 80a is a flow-rate control unit for controlling the flow rates of the coolants flowing through the respective coolant-circulation devices.

A switching-valve control unit 80b of the controller 80 controls the operations of the cooler-side valve 43 and the heater-side valve 67. The switching-valve control unit 80b also serves as a circulation switching control unit that switches the circulation state of the coolant. The switching-valve control unit 80b further serves as a flow-rate control unit that adjusts the flow rate of the coolant flowing through the respective coolant-circulation devices.

The flow-rate control of the coolant may be conducted by a system for controlling the flow rate of the coolant by continuously changing a coolant-passage opening area of the inside of each valve to control the pressure loss. Alternatively, the flow-rate control of the coolant may be conducted by a system for controlling the flow rate on a time-average by repeatedly switching between passing and interrupting of the coolant at a predetermined ratio within a predetermined period of time.

The operation of the compressor 26 is controlled by a compressor control unit 80c of the controller 80. The compressor control unit 80c is also a refrigerant flow-rate control unit that controls the flow rate of the refrigerant discharged from the compressor 26.

The operation of the exterior blower 33 is controlled by an exterior blower control unit 80d of the controller 80. The exterior blower control unit 80d is also an outside-air flow-rate control unit that controls the flow rate of the outside air flowing through the radiator circuit 14.

The operation of various doors (e.g., air mix door 72 and the like) of the interior air-conditioning unit 70 is controlled by an air-conditioning switching control unit 80e of the controller 80. The air-conditioning switching control unit 80e is also a blown-air temperature control unit that controls the temperature of air blown from the interior air-conditioning unit 70 to the vehicle interior.

Alternatively, the respective control units 80a, 80b, 80c, 80d, and 80e may be configured separately from the controller 80.

Detection signals from a group of sensors are input to the input side of the controller 80. The group of sensors includes an inside-air temperature sensor 81, an outside-air temperature sensor 82, a solar radiation sensor 83, a cooler coolant-temperature sensor 84, an engine coolant-temperature sensor 85, a condenser coolant-temperature sensor 86, a radiator coolant-temperature sensor 87, a cooler-core temperature sensor 88, a heater-core temperature sensor 89, a device temperature sensor 90, a refrigerant temperature sensor 91, and a refrigerant pressure sensor 92.

The inside-air temperature sensor 81 is an inside-air temperature detector that detects the temperature of inside air (the vehicle interior temperature). The outside-air temperature sensor 82 is an outside-air temperature detector that detects the temperature of outside air (the vehicle exterior temperature). The solar radiation sensor 83 is a solar radiation amount detector that detects the amount of solar radiation received by the vehicle interior.

The cooler coolant-temperature sensor 84 is a coolant temperature detector (heat-medium temperature detector) that detects the temperature of the coolant flowing through the cooler cooling circuit 11 (for example, the temperature of the coolant flowing out of the chiller 21).

The engine coolant-temperature sensor 85 is a coolant temperature detector (heat-medium temperature detector) that detects the temperature of the coolant flowing through the engine cooling circuit 12 (for example, the temperature of the coolant drawn into the engine pump 30).

The condenser coolant-temperature sensor 86 is a coolant temperature detector (heat-medium temperature detector) that detects the temperature of the coolant flowing through the condenser circuit 13 (for example, the temperature of the coolant having flowed out of the condenser 52).

The radiator coolant-temperature sensor 87 is a coolant temperature detector (heat-medium temperature detector) that detects the temperature of the coolant flowing through the radiator circuit 14 (for example, the temperature of the coolant having flowed out of the heater-side radiator 61).

The cooler-core temperature sensor 88 is a detector (cooler-core temperature detector) that detects the surface temperature of the cooler core 22. The cooler-core temperature sensor 88 includes, for example, a fin thermistor 88a (see FIG. 1) for detecting the temperature of a heat exchange fin in the cooler core 22, and a coolant-temperature sensor 88b (see FIG. 2) for detecting the temperature of the coolant flowing through the cooler core 22.

The heater-core temperature sensor 89 is a detector (heater-core temperature detector) that detects the surface temperature of the heater core 51. The heater-core temperature sensor 89 includes, for example, a fin thermistor for detecting the temperature of a heat exchange fin in the heater core 51, and a coolant-temperature sensor for detecting the temperature of the coolant flowing through the heater core 51.

The device temperature sensor 90 is a device temperature detector that detects the temperature of the coolant flowing through the coolant circulation device 62 (for example, the temperature of the coolant flowing out of the coolant circulation device 62).

The refrigerant temperature sensor 91 is a refrigerant temperature detector that detects the refrigerant temperature in the refrigeration cycle 25 (for example, the temperature of refrigerant discharged from the compressor 26, or the temperature of the refrigerant drawn into the compressor 26).

The refrigerant pressure sensor 93 is a refrigerant pressure detector that detects the pressure of the refrigerant in the refrigeration cycle 25 (for example, the pressure of the refrigerant discharged from the compressor 26, or the pressure of the refrigerant drawn into the compressor 26).

An operation panel 95 is provided with various air-conditioning operation switches. Operation signals from these operation switches are input to the input side of the controller 80. For example, the operation panel 95 is disposed near the dashboard at the front of the vehicle compartment.

Various air-conditioning operation switches provided on the operation panel 95 include an automatic switch 95a, an air conditioner switch 95b, a defroster switch 95c, and a vehicle-interior temperature setting switch 95d.

The automatic switch 95a is an operation portion for setting an automatic control operation of the air conditioning. The air conditioner switch 95b is an operation portion for manually operating and stopping the compressor 26. The defroster switch 95c is an operation portion for manually setting or resetting a defroster mode. The vehicle-interior temperature setting switch 95d is an operation portion for setting a target vehicle interior temperature Tset.

Each switch may be a push switch that brings electric contacts into conduction by being mechanically pushed, or a touch screen that reacts in response to contact with a predetermined region on an electrostatic panel.

The controller 80 calculates a target air outlet temperature TAO of the air blown into the vehicle interior as well as a target cooler-core blowing temperature TCO of the air blown from the cooler core 22.

The target air outlet temperature TAO is a value determined so that an inside air temperature Tr quickly approaches a target temperature Tset desired by the occupant, and is calculated by the following formula F1.

$$TAO = Kset \times Tset - Kr \times Tr - Kam \times Tam - Ks \times Ts + C \qquad \text{F1}$$

where Tset is a target vehicle-interior temperature set by the vehicle-interior temperature setting switch 95d; Tr is an inside air temperature detected by the inside-air temperature sensor 81; Tam is an outside air temperature detected by the outside-air temperature sensor 82; Ts is a solar radiation amount detected by the solar radiation sensor 83; Kset, Kr, Kam, and Ks are control gains; and C is a constant for correction.

The target cooler-core blowing temperature TCO is calculated based on the target air outlet temperature TAO and the like. Specifically, the target cooler-core blowing temperature TCO is calculated to decrease in accordance with a decrease in the target air outlet temperature TAO. Furthermore, the target cooler-core blowing temperature TCO is calculated so as to be equal to or higher than a reference frost-formation preventing temperature (for example, 1° C.) that is determined to be capable of suppressing the frost formation on the cooler core 22.

An engine controller 99 is comprised of a known microcomputer, including a CPU, a ROM, and a RAM, and a peripheral circuit thereof. The engine controller 99 is an engine control unit that performs various computations and processing based on engine control programs stored in the ROM to thereby control the operation of the engine 31.

Various engine components configuring the engine 31 are connected to the output side of the engine controller 99. Specifically, the engine components include a starter for starting the engine 31 and a driving circuit for a fuel injection valve (injector) that supplies fuel to the engine 31.

The group of various sensors for engine control is connected to the input side of the engine controller 99. Specifically, the group of the sensors for the engine control includes an accelerator opening sensor that detects an accelerator position, an engine speed sensor that detects the number of revolutions of the engine, and a vehicle speed sensor that detects the vehicle speed.

The controller 80 and the engine controller 99 are electrically connected to be capable of communicating each other. Thus, based on a detection signal or an operation signal input from one controller, the other controller can also control the operation of the respective devices connected to the output side thereof. For example, the controller 80 outputs a request signal to the engine controller 99, and thereby can request the engine controller 99 to operate the engine 31.

When receiving the request signal (operation request signal) that requests the operation of the engine 31 from the controller 80, the engine controller 99 determines the necessity of the operation of the engine 31, and then controls the operation of the engine 31 based on the determination result.

A structure (hardware and software) of the controller 80 that outputs the request signal to the engine controller 99 is a request outputting portion 80*f*. The request outputting portion 80*f* may be formed separately from the controller 80.

Next, the operation of the above-mentioned structure will be described. The controller 80 controls the operations of individual control target devices connected to its output side to switch to various operation modes.

Various operation modes include, for example, an air-cooling mode, a dehumidification heating mode, an outside-air heat-absorption type heat-pump air-heating mode, another outside-air heat-absorption type heat-pump air-heating mode (with engine exhaust-heat assist), an outside-air usage dehumidification mode, an engine heat-absorption type heat-pump air-heating mode, and a heat-pump reheat dehumidification mode.

(1) Air-Cooling Mode and Dehumidification Heating Mode

The air-cooling mode is an air-conditioning mode of cooling the vehicle interior by using the refrigeration cycle 25. The dehumidification heating mode is an air-conditioning mode of heating the vehicle interior by using exhaust heat from the engine 31 while dehumidifying the vehicle interior by using the refrigeration cycle 25.

Figure 3:
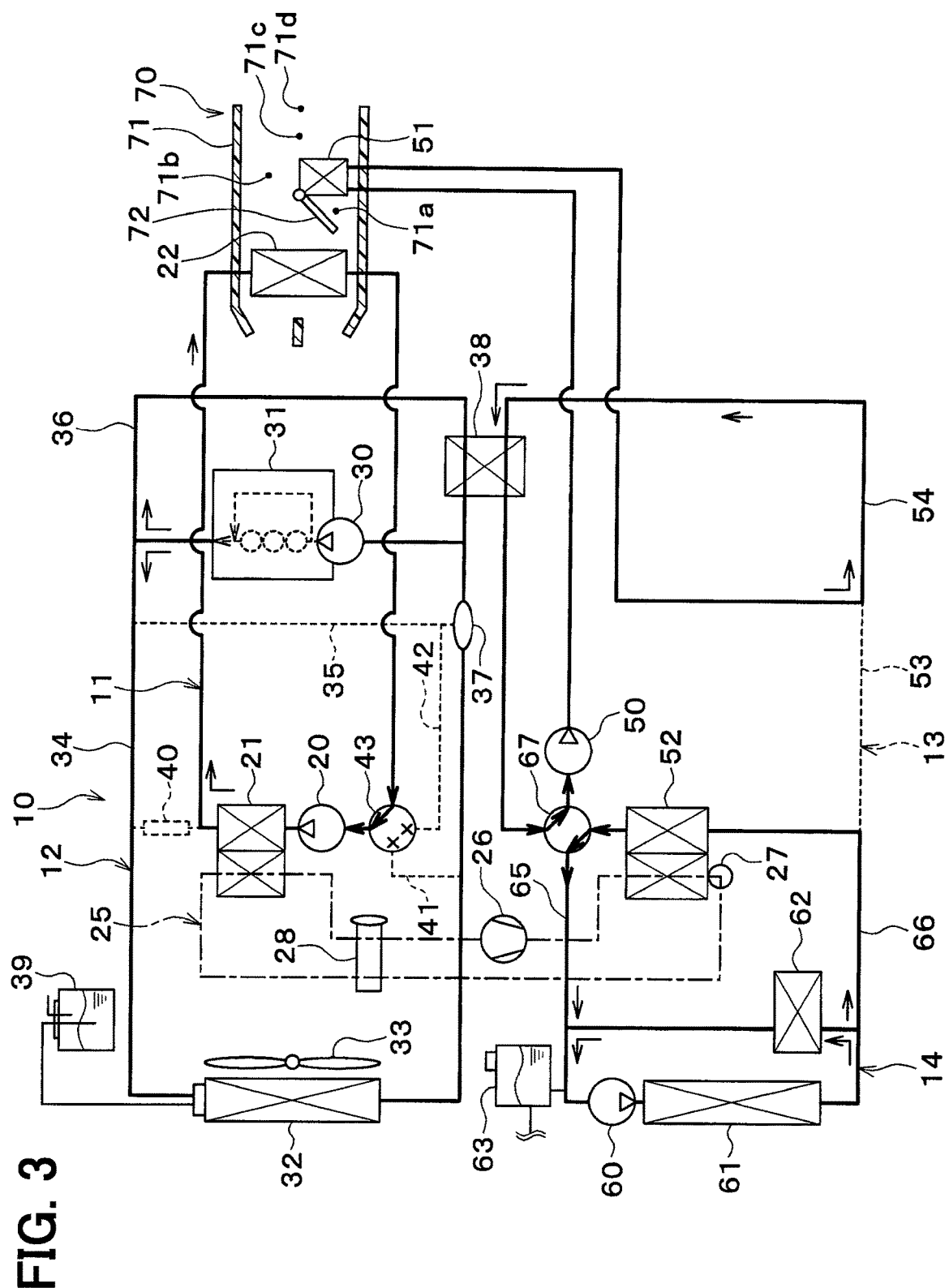
FIG. 3 is a diagram showing the states of coolant flows in an air-cooling mode and a dehumidification heating mode of the vehicle thermal management system in the first embodiment.

In the air-cooling mode and the dehumidification heating mode, as shown in FIG. 3, the cooler-side valve 43 communicates the flow path on the coolant outlet side of the cooler core 22 with the flow path on the coolant inlet side of the chiller 21, and closes the engine-radiator flow path 41 and the engine heat-absorption flow path 42. The heater-side valve 67 communicates the coolant-coolant heat-exchanger flow path 54 with the flow path on the coolant inlet side of the heater core 51, while communicating the flow path on the coolant outlet side of the condenser 52 with the radiator inlet-side flow path 65.

The air-cooling mode and the dehumidification heating mode are selected when the coolant in the engine cooling circuit 12 is at a high temperature (for example, 60° C. or higher) that can be directly used for air-heating. Therefore, in the air-cooling mode and the dehumidification heating mode, the thermostat 37 closes the radiator bypass flow path 35 and opens the flow path on a side of the engine radiator 32.

Thus, the cooler cooling circuit 11 and the engine cooling circuit 12 allow the coolant to circulate independently therethrough.

In the cooler cooling circuit 11, the coolant is cooled by the chiller 21 and then is allowed to flow through the cooler core 22, so that the air (air to be blown into the vehicle interior) flowing within the casing 71 of the interior air-conditioning unit 70 is cooled by the cooler core 22.

In the engine cooling circuit 12, the coolant heated by the engine 31 is allowed to flow through the coolant-coolant heat exchanger 38, so that the coolant flowing through the coolant-coolant heat-exchanger flow path 54 is heated by the coolant-coolant heat exchanger 38.

The coolant heated by the coolant-coolant heat-exchanger flow path 54 is allowed to flow through the heater core 51, so that the air (air to be blown into the vehicle interior) flowing within the casing 71 of the interior air-conditioning unit 70 is heated by the heater core 51.

The coolant heated by the condenser 52 and the coolant heated by the coolant circulation device 62 are allowed to flow through the heater-side radiator 61, thereby dissipating the exhaust heat from the condenser 52 and from the coolant circulation device 62 into the outside air in the heater-side radiator 61.

The flow rate of the refrigerant circulating through the refrigeration cycle 25 is regulated by adjusting the number of revolutions of the compressor 26, causing the blowing temperature at the cooler core 22 to approach the target temperature.

Further, the flow rate of the coolant flowing through the cooler core 22 may be regulated by adjusting the number of revolutions of the cooler pump 20, causing the blowing temperature at the cooler core 22 to approach the target temperature.

Within the casing 71 of the interior air-conditioning unit 70, the opening degree of the air mix door 72 is adjusted, so that the temperature of the conditioned air blown from the interior air-conditioning unit 70 into the vehicle interior approaches the target temperature.

The temperature of the conditioned air blown from the interior air-conditioning unit 70 into the vehicle interior can be estimated based on the blowing temperature at the cooler core 22, the blowing temperature at the heater core 51, and the opening degree of the air mix door 72.

The flow rate of the coolant flowing through the engine cooling circuit 12 may be regulated by adjusting the number of revolutions of the engine pump 30. In this way, the temperature of the conditioned air blown from the interior air-conditioning unit 70 into the vehicle interior may approach the target temperature.

The flow rate of the coolant flowing through the coolant-coolant heat-exchanger flow path 54 and the heater core 51 may be regulated by adjusting the number of revolutions of the heater pump 50. Thus, the temperature of the conditioned air blown from the interior air-conditioning unit 70 into the vehicle interior may approach the target temperature.

(2) Outside-Air Heat-Absorption Type Heat-Pump Air-Heating Mode

The outside-air heat-absorption type heat-pump air-heating mode is an air conditioning mode of performing air-heating of the vehicle interior using heat absorbed from the outside air.

Figure 4:
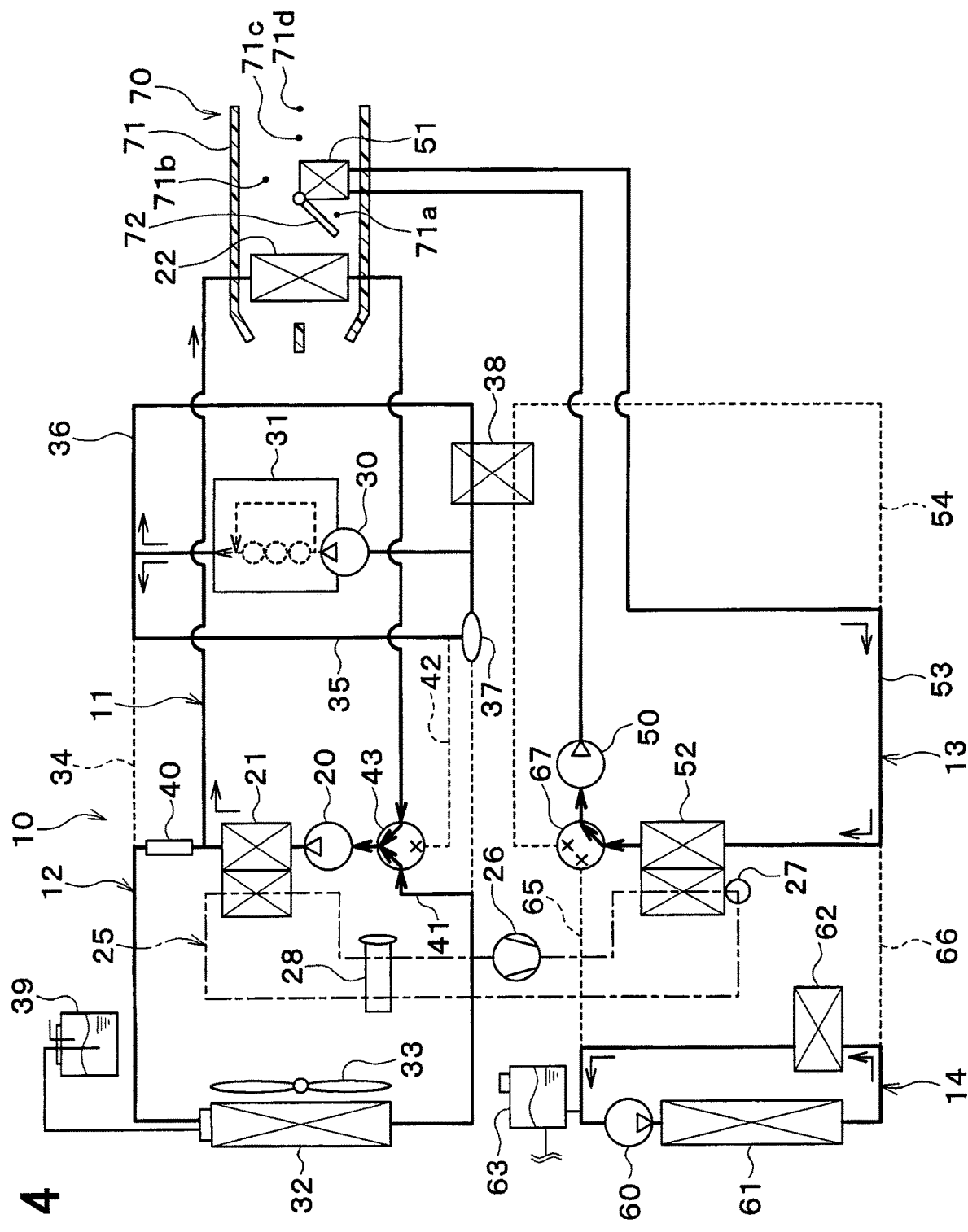
FIG. 4 is a diagram showing the state of a coolant flow in an outside-air heat-absorption type heat-pump air-heating mode of the vehicle thermal management system in the first embodiment.

In the outside-air heat-absorption type heat-pump air-heating mode, as shown in FIG. 4, the cooler-side valve 43 communicates the flow path on the coolant outlet side of the cooler core 22 and the engine-radiator flow path 41 with the flow path on the coolant inlet side of the chiller 21 and closes the engine heat-absorption flow path 42. The heater-side valve 67 communicates the flow path on the coolant outlet side of the condenser 52 with the flow path on the coolant inlet side of the heater core 51 and closes the coolant-coolant heat-exchanger flow path 54 and the radiator inlet-side flow path 65.

The outside-air heat-absorption type heat-pump air-heating mode is selected when the coolant in the engine cooling circuit 12 is at a low temperature (for example, of lower than 60° C.) that cannot be directly used for air-heating. Therefore, in the outside-air heat-absorption type heat-pump air-heating mode, the thermostat 37 opens the radiator bypass flow path 35 and closes the flow path on the side of the engine radiator 32.

Thus, the coolant cooled by the chiller 21 flows through the engine radiator 32, whereby the coolant absorbs heat from the outside air in the engine radiator 32. The coolant cooled by the chiller 21 flows through the cooler core 22, whereby the air flowing in the casing 71 of the interior air-conditioning unit 70 (air to be blown into the vehicle interior) is cooled and dehumidified by the cooler core 22.

At this time, when the outside air temperature is below the freezing point (0° C. or lower), the temperature of the coolant also becomes below the freezing point. Thus, to suppress the frost formation on the cooler core 22, the flow rate of the coolant flowing through the cooler core 22 is adjusted. In other cases, the amount of heat absorption in the engine radiator 32 is controlled by adjusting the flow rate of the coolant through the engine radiator 32 to prevent the temperature of the coolant in the cooler core 22 from becoming extremely high.

When the dehumidification is unnecessary, the cooler-side valve 43 interrupts the circulation of the coolant to the cooler core 22.

Thus, the condenser circuit 13 and the radiator circuit 14 allow the coolant to circulate independently therethrough. In the condenser circuit 13, the coolant heated by the condenser 52 is allowed to flow through the heater core 51, so that the air (air to be blown into the vehicle interior) flowing within the casing 71 of the interior air-conditioning unit 70 is heated by the heater core 51.

In the radiator circuit 14, the coolant heated by the coolant circulation device 62 flows through the heater-side radiator 61, so that the exhaust heat from the coolant circulation device 62 is dissipated into the outside air in the heater-side radiator 61.

That is, the exhaust heat from the coolant circulation device 62 can be dissipated into the outside air in the heater-side radiator 61, while absorbing heat from the outside air in the engine radiator 32. Thus, a heat-pump operation of the refrigeration cycle 25 can cool the coolant circulation device 62 substantially at the same temperature as the outside air temperature, while performing air-heating, so that the coolant circulation device 62 can be cooled to an appropriate temperature.

The heater-side radiator 61 is disposed on the upstream side in the outside-air flow direction with respect to the engine radiator 32. Thus, the exhaust heat dissipated from the coolant circulation device 62 into the outside air in the heater-side radiator 61 is absorbed in the coolant at the engine radiator 32.

At this time, since the temperature of air around the engine radiator 32 rises, the heat absorption temperature is increased, and thus the heat absorption amount can be ensured even when the refrigerant pressure at the chiller 21 increases, thereby improving the COP. Furthermore, as the coolant temperature of the engine radiator 32 also rises, the frost is less likely to be formed, which can suppress the reduction in the COP, thereby improving the air-heating efficiency.

The flow rate of the coolant flowing through the cooler core 22 and the flow rate of the coolant flowing through the engine radiator 32 may be regulated by adjusting the number of revolutions of the cooler pump 20 and the opening degree of the cooler-side valve 43, whereby the blowing temperature at the cooler core 22 approaches the target temperature.

Within the casing 71 of the interior air-conditioning unit 70, the opening degree of the air mix door 72 is adjusted, so that the temperature of the conditioned air blown from the interior air-conditioning unit 70 into the vehicle interior approaches the target temperature.

The flow rate of the coolant flowing through the engine cooling circuit 12 may be regulated by adjusting the number of revolutions of the engine pump 30. In this way, the temperature of the conditioned air blown from the interior air-conditioning unit 70 into the vehicle interior may approach the target temperature.

The flow rate of the coolant flowing through the coolant-coolant heat-exchanger flow path 54 and the heater core 51 may be regulated by adjusting the number of revolutions of the heater pump 50. Thus, the temperature of the conditioned air blown from the interior air-conditioning unit 70 into the vehicle interior may approach the target temperature.

The flow rate of the refrigerant circulating through the refrigeration cycle 25 may be regulated by adjusting the number of revolutions of the compressor 26. In this way, the temperature of the conditioned air blown from the interior air-conditioning unit 70 into the vehicle interior may approach the target temperature.

(3) Another Outside-Air Heat-Absorption Type Heat-Pump Air-Heating Mode (With Engine Exhaust-Heat Assist)

Another outside-air heat-absorption type heat-pump air-heating mode (with the engine exhaust-heat assist) is an air conditioning mode of performing air-heating of the vehicle interior using heat absorbed from the outside air and exhaust heat from the engine 31.

Figure 5:
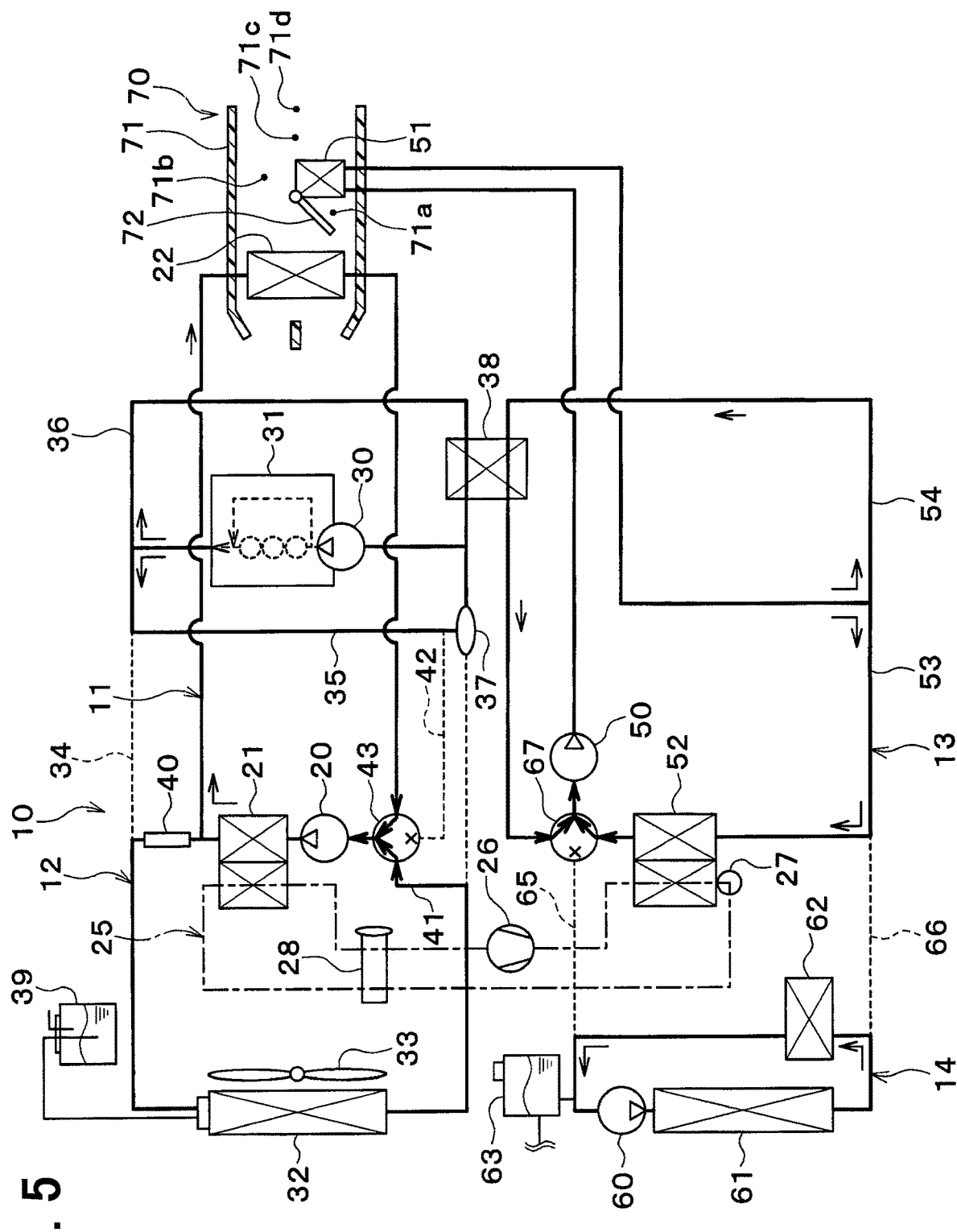
FIG. 5 is a diagram showing the states of coolant flows in an outside-air heat-absorption type heat-pump air-heating mode (with engine exhaust-heat assist) and an outside-air usage dehumidification mode of the vehicle thermal management system in the first embodiment.

In this outside-air heat-absorption type heat-pump air-heating mode (with the engine exhaust-heat assist), as shown in FIG. 5, the cooler-side valve 43 communicates the flow path on the coolant outlet side of the cooler core 22 and the engine-radiator flow path 41 with the flow path on the coolant inlet side of the chiller 21 and closes the engine heat-absorption flow path 42. The heater-side valve 67 communicates the flow path on the coolant outlet side of the condenser 52 and the coolant-coolant heat-exchanger flow path 54 with the flow path on the coolant inlet side of the heater core 51 and closes the radiator inlet-side flow path 65.

The outside-air heat-absorption type heat-pump air-heating mode (with the engine exhaust-heat assist) is selected when the coolant in the engine cooling circuit 12 is at a low temperature (for example, of lower than 60° C.) that cannot be directly used for air-heating. Therefore, in the outside-air heat-absorption type heat-pump air-heating mode (with the engine exhaust-heat assist), the thermostat 37 opens the radiator bypass flow path 35 and closes the flow path on the engine radiator 32 side.

Thus, the coolant cooled by the chiller 21 flows through the engine radiator 32, whereby the coolant absorbs heat from the outside air in the engine radiator 32. Further, the coolant cooled by the chiller 21 flows through the cooler core 22, whereby the air flowing in the casing 71 of the interior air-conditioning unit 70 (air to be blown into the vehicle interior) is cooled and dehumidified by the cooler core 22.

At this time, when the outside-air temperature is below the freezing point of water (0° C.), the flow rate of the coolant at the cooler core 22 is adjusted to suppress the frost formation at the cooler core 22. In other cases, the amount of heat absorption in the engine radiator 32 is controlled by adjusting the flow rate of the coolant through the engine radiator 32 to prevent the temperature of the coolant in the cooler core 22 from becoming extremely high.

When the dehumidification is unnecessary, the cooler-side valve 43 interrupts the circulation of the coolant to the cooler core 22.

In the engine cooling circuit 12, the coolant heated by the engine 31 is allowed to flow through the coolant-coolant heat exchanger 38. In the outside-air heat-absorption type heat-pump air-heating mode (with the engine exhaust-heat assist), the temperature of the coolant flowing into the coolant-coolant heat exchanger 38 in the engine cooling circuit 12 is higher than the temperature of the coolant flowing into the coolant-coolant heat exchanger 38 in the condenser circuit 13. Thus, the coolant flowing through the coolant-coolant heat-exchanger flow path 54 is heated in the coolant-coolant heat exchanger 38.

Adjustment of the amount of heat exchange in the coolant-coolant heat exchanger 38 is carried out by the adjustment of the flow rate of the coolant in the engine pump 30, the adjustment of the flow rate of the coolant in the heater pump 50, or the adjustment of the flow rate of the coolant in the heater-side valve 67.

In the condenser circuit 13, the coolant heated by the coolant-coolant heat-exchanger flow path 54 is allowed to flow through the heater core 51, so that the air (air to be blown into the vehicle interior) flowing within the casing 71 of the interior air-conditioning unit 70 is heated by the heater core 51.

Furthermore, in the condenser circuit 13, the coolant heated by the condenser 52 is allowed to flow through the heater core 51, so that the air (air to be blown into the vehicle interior) flowing within the casing 71 of the interior air-conditioning unit 70 is heated by the heater core 51.

The flow rate of the coolant or the like is controlled such that the amount of heat taken by the coolant from the engine 31 is at a level that can just maintain the temperature of the coolant in the engine cooling circuit 12 within a predetermined temperature range. Thus, this control can suppress the deterioration of the fuel efficiency due to a decrease in the coolant temperature in the engine cooling circuit 12, while enabling air-heating without increasing the operating rate of the engine 31, thereby making it possible to improve the fuel efficiency during the air heating.

In the radiator circuit 14, the coolant heated by the coolant circulation device 62 flows through the heater-side radiator 61, so that the exhaust heat from the coolant circulation device 62 is dissipated into the outside air in the heater-side radiator 61.

That is, the exhaust heat from the coolant circulation device 62 can be dissipated into the outside air in the heater-side radiator 61, while absorbing heat from the outside air in the engine radiator 32. Thus, a heat-pump operation of the refrigeration cycle 25 can cool the coolant circulation device 62 substantially at the same temperature as the outside air temperature, while performing air-heating, so that the coolant circulation device 62 can be cooled to an appropriate temperature.

The heater-side radiator 61 is disposed on the upstream side in the outside-air flow direction with respect to the engine radiator 32. Thus, the exhaust heat from the coolant circulation device 62 that is dissipated into the outside air in the heater-side radiator 61 is absorbed into the coolant in the engine radiator 32.

At this time, since the temperature of air around the engine radiator 32 rises, the heat absorption temperature is increased, and thus the heat absorption amount can be ensured even when the refrigerant pressure at the chiller 21 becomes high, thereby improving the COP. Furthermore, as the coolant temperature of the engine radiator 32 also rises, the frost is less likely to be formed, which can suppress the reduction in the COP, thereby improving the air-heating efficiency.

The flow rate of the coolant flowing through the cooler core 22 and the flow rate of the coolant flowing through the engine radiator 32 may be regulated by adjusting the number of revolutions of the cooler pump 20 and the opening degree of the cooler-side valve 43, whereby the blowing temperature at the cooler core 22 approaches the target temperature.

Within the casing 71 of the interior air-conditioning unit 70, the opening degree of the air mix door 72 is adjusted, so that the temperature of the conditioned air blown from the interior air-conditioning unit 70 into the vehicle interior approaches the target temperature.

The flow rate of the coolant flowing through the engine cooling circuit 12 may be regulated by adjusting the number of revolutions of the engine pump 30. In this way, the temperature of the conditioned air blown from the interior air-conditioning unit 70 into the vehicle interior may approach the target temperature.

The flow rate of the coolant flowing through the coolant-coolant heat-exchanger flow path 54 and the heater core 51 may be regulated by adjusting the number of revolutions of the heater pump 50. Thus, the temperature of the conditioned air blown from the interior air-conditioning unit 70 into the vehicle interior may approach the target temperature.

The flow rate of the refrigerant circulating through the refrigeration cycle 25 may be regulated by adjusting the number of revolutions of the compressor 26. In this way, the temperature of the conditioned air blown from the interior air-conditioning unit 70 into the vehicle interior may approach the target temperature.

(4) Outside-Air Usage Dehumidification Mode

The outside-air usage dehumidification mode is an air-conditioning mode that dehumidifies the vehicle interior by using the low-temperature outside air without utilizing the refrigeration cycle 25.

In the outside-air usage dehumidification mode, the compressor 26 in the refrigeration cycle 25 is stopped in the switched state of the outside-air heat-absorption type heat-pump air-heating mode (with the engine exhaust-heat assist)

shown in FIG. 5. Note that in the outside-air usage dehumidification mode, the cooler-side valve 43 fully opens the communication opening degree between the coolant flow path in the cooler cooling circuit 11 and the engine-radiator flow path 41.

The outside-air usage dehumidification mode is selected when the temperature of the coolant in the engine cooling circuit 12 is lower than the target blowing temperature at the cooler core 22. Therefore, in the outside-air usage dehumidification mode, the thermostat 37 opens the radiator bypass flow path 35 and closes the flow path on the side of the engine radiator 32.

Thus, the coolant cooled using the low-temperature outside air in the engine radiator 32 flows through the cooler core 22, whereby the air flowing in the casing 71 of the interior air-conditioning unit 70 (air to be blown into the vehicle interior) is cooled and dehumidified by the cooler core 22.

At this time, when the outside-air temperature is below the freezing point of water (0° C.), the flow rate of the coolant at the cooler core 22 is adjusted to suppress the frost formation at the cooler core 22.

When the dehumidification is unnecessary, the cooler pump 20 stops the circulation of the coolant to the cooler core 22.

In the engine cooling circuit 12, the coolant heated by the engine 31 is allowed to flow through the coolant-coolant heat exchanger 38. The outside-air usage dehumidification mode is selected when the temperature of the coolant flowing into the coolant-coolant heat exchanger 38 in the engine cooling circuit 12 is higher than the temperature of the coolant flowing into the coolant-coolant heat exchanger 38 in the condenser circuit 13. Thus, the coolant flowing through the coolant-coolant heat-exchanger flow path 54 is heated in the coolant-coolant heat exchanger 38.

Adjustment of the amount of heat exchange in the coolant-coolant heat exchanger 38 is carried out by the adjustment of the flow rate of the coolant in the engine pump 30, the adjustment of the flow rate of the coolant in the heater pump 50, or the adjustment of the flow rate of the coolant in the heater-side valve 67.

In the condenser circuit 13, the coolant heated by the coolant-coolant heat-exchanger flow path 54 is allowed to flow through the heater core 51, so that the air (air to be blown into the vehicle interior) flowing within the casing 71 of the interior air-conditioning unit 70 is heated by the heater core 51.

The flow rate of the coolant or the like is controlled such that the amount of heat taken by the coolant from an engine 31 is set at a level that can just maintain the temperature of the coolant in the engine cooling circuit 12 within a predetermined temperature range. Thus, the control can suppress the deterioration of the fuel efficiency due to a decrease in the coolant temperature in the engine cooling circuit 12, and can also perform air-heating without increasing the operating rate of the engine 31, thus leading to the improvement of the fuel efficiency during the air heating.

In the radiator circuit 14, the coolant heated by the coolant circulation device 62 flows through the heater-side radiator 61, so that the exhaust heat from the coolant circulation device 62 is dissipated into the outside air in the heater-side radiator 61.

The flow rate of the coolant flowing through the cooler core 22 and the engine radiator 32 may be regulated by adjusting the number of revolutions of the cooler pump 20, causing the blowing temperature at the cooler core 22 to approach the target temperature.

Within the casing 71 of the interior air-conditioning unit 70, the opening degree of the air mix door 72 is adjusted, so that the temperature of the conditioned air blown from the interior air-conditioning unit 70 into the vehicle interior approaches the target temperature.

The flow rate of the coolant flowing through the engine cooling circuit 12 may be regulated by adjusting the number of revolutions of the engine pump 30. In this way, the temperature of the conditioned air blown from the interior air-conditioning unit 70 into the vehicle interior may approach the target temperature.

The flow rate of the coolant flowing through the coolant-coolant heat-exchanger flow path 54 and the heater core 51 may be regulated by adjusting the number of revolutions of the heater pump 50. Thus, the temperature of the conditioned air blown from the interior air-conditioning unit 70 into the vehicle interior may approach the target temperature.

(5) Engine Heat-Absorption Type Heat-Pump Air-Heating Mode

The engine heat-absorption type heat-pump air-heating mode is an air-conditioning mode of performing air-heating of the vehicle interior using exhaust heat absorbed from the engine 31.

Figure 6:
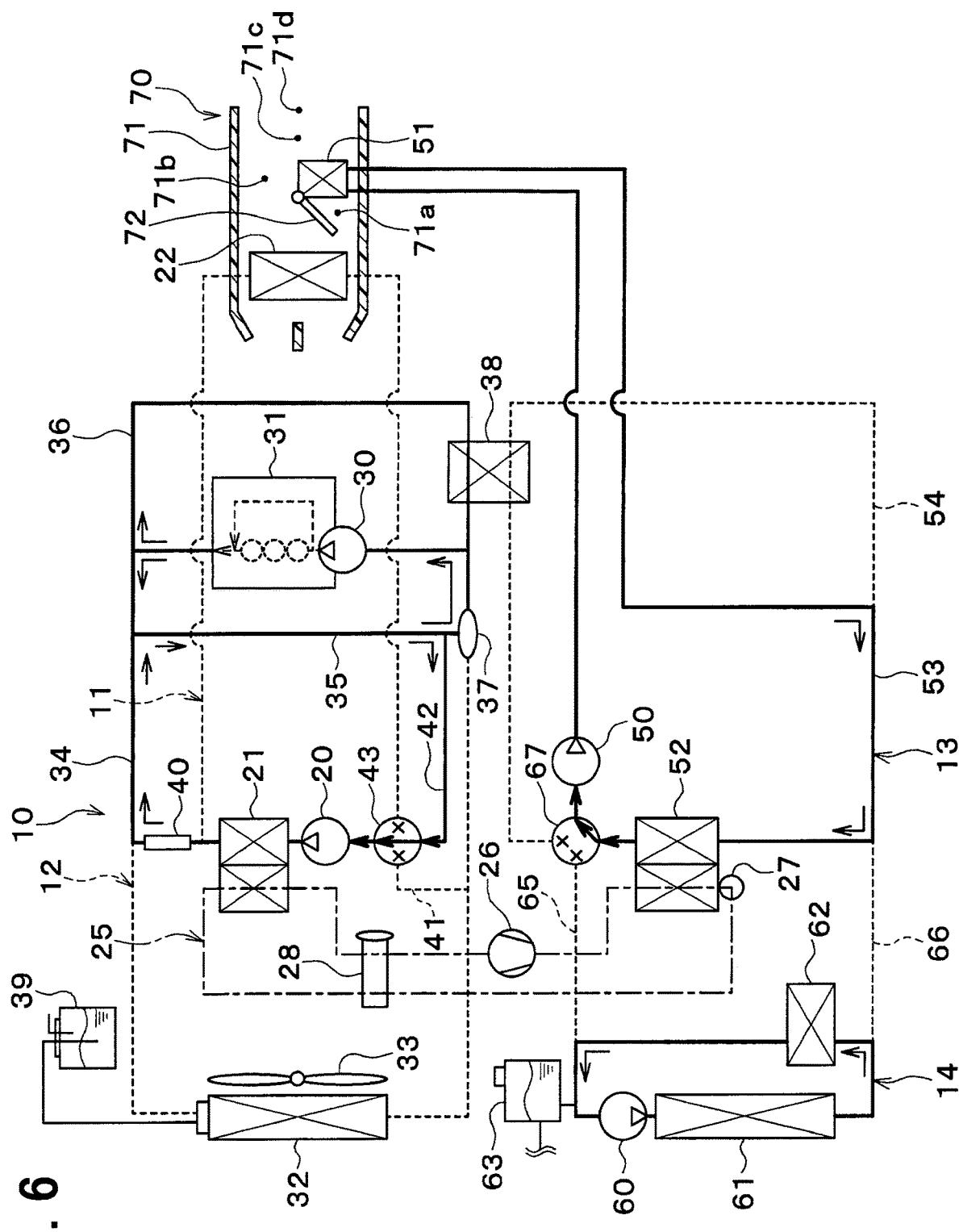
FIG. 6 is a diagram showing the state of a coolant flow in an engine heat-absorption type heat-pump air-heating mode of the vehicle thermal management system in the first embodiment.

In the engine heat-absorption type heat-pump air-heating mode, as shown in FIG. 6, the cooler-side valve 43 communicates the engine heat-absorption flow path 42 with the flow path on the coolant inlet side of the chiller 21, and closes the flow path on the coolant outlet side of the cooler core 22 and the engine-radiator flow path 41. The heater-side valve 67 communicates the flow path on the coolant outlet side of the condenser 52 with the flow path on the coolant inlet side of the heater core 51 and closes the coolant-coolant heat-exchanger flow path 54 and the radiator inlet-side flow path 65.

The engine heat-absorption type heat-pump air-heating mode is selected when the coolant in the engine cooling circuit 12 is at a low temperature (for example, of lower than 60° C.) that cannot be directly used for air-heating. Therefore, in the engine heat-absorption type heat-pump air-heating mode, the thermostat 37 opens the radiator bypass flow path 35 and closes the flow path on the side of the engine radiator 32.

Thus, the coolant heated by the engine 31 flows through the chiller 21, whereby the coolant absorbs exhaust heat from the engine 31 in the chiller 21.

In the condenser circuit 13, the coolant heated by the condenser 52 is allowed to flow through the heater core 51, so that the air (air to be blown into the vehicle interior) flowing within the casing 71 of the interior air-conditioning unit 70 is heated by the heater core 51.

The flow rate of the coolant or the like is controlled such that the amount of heat taken by the coolant from the engine 31 is at a level that can just maintain the temperature of the coolant in the engine cooling circuit 12 within the predetermined temperature range. Thus, the control can suppress the deterioration of the fuel efficiency due to a decrease in the temperature of the coolant, and can perform air-heating without enhancing an engine operating rate, thereby improving the fuel efficiency during the air heating.

Suppose that the coolant temperature in the engine cooling circuit 12 is decreasing and the amount of heat absorption is also decreasing, thus failing to exhibit the necessary air-heating performance. In this case, the thermal management system is switched to the outside-air heat-absorption mode, thereby suppressing the decrease in the coolant temperature in the engine cooling circuit 12, thus suppressing the deterioration of the fuel efficiency.

In the radiator circuit 14, the coolant heated by the coolant circulation device 62 flows through the heater-side radiator 61, so that the exhaust heat from the coolant circulation device 62 is dissipated into the outside air in the heater-side radiator 61.

The heater-side radiator 61 is disposed on the upstream side in the outside-air flow direction with respect to the engine radiator 32. Thus, the temperature of an atmosphere around the engine 31 is raised with the exhaust heat from the coolant circulation device 62 that is dissipated into the outside air in the heater-side radiator 61. Consequently, the amount of heat dissipation from the surface of the engine 31 is decreased, thus improving the heat retention performance.

Within the casing 71 of the interior air-conditioning unit 70, the opening degree of the air mix door 72 is adjusted, so that the temperature of the conditioned air blown from the interior air-conditioning unit 70 into the vehicle interior approaches the target temperature.

The flow rate of the coolant flowing through the coolant-coolant heat-exchanger flow path 54 and the heater core 51 may be regulated by adjusting the number of revolutions of the heater pump 50. In this way, the temperature of the conditioned air blown from the interior air-conditioning unit 70 into the vehicle interior may approach the target temperature.

The flow rate of the refrigerant circulating through the refrigeration cycle 25 may be regulated by adjusting the number of revolutions of the compressor 26. In this way, the temperature of the conditioned air blown from the interior air-conditioning unit 70 into the vehicle interior may approach the target temperature.

In the engine heat-absorption type heat-pump air-heating mode, the cooling and dehumidification of the air cannot be carried out by the cooler core 22. When a dehumidification request is made, the thermal management system is switched to the above-mentioned outside-air heat-absorption type heat-pump air-heating mode, thereby cooling and dehumidifying the air in the cooler core 22.

(6) Heat-Pump Reheat Dehumidification Heating Mode

The heat-pump reheat dehumidification heating mode is an air-conditioning mode of dehumidifying and air-heating by using the refrigeration cycle 25.

Figure 7:
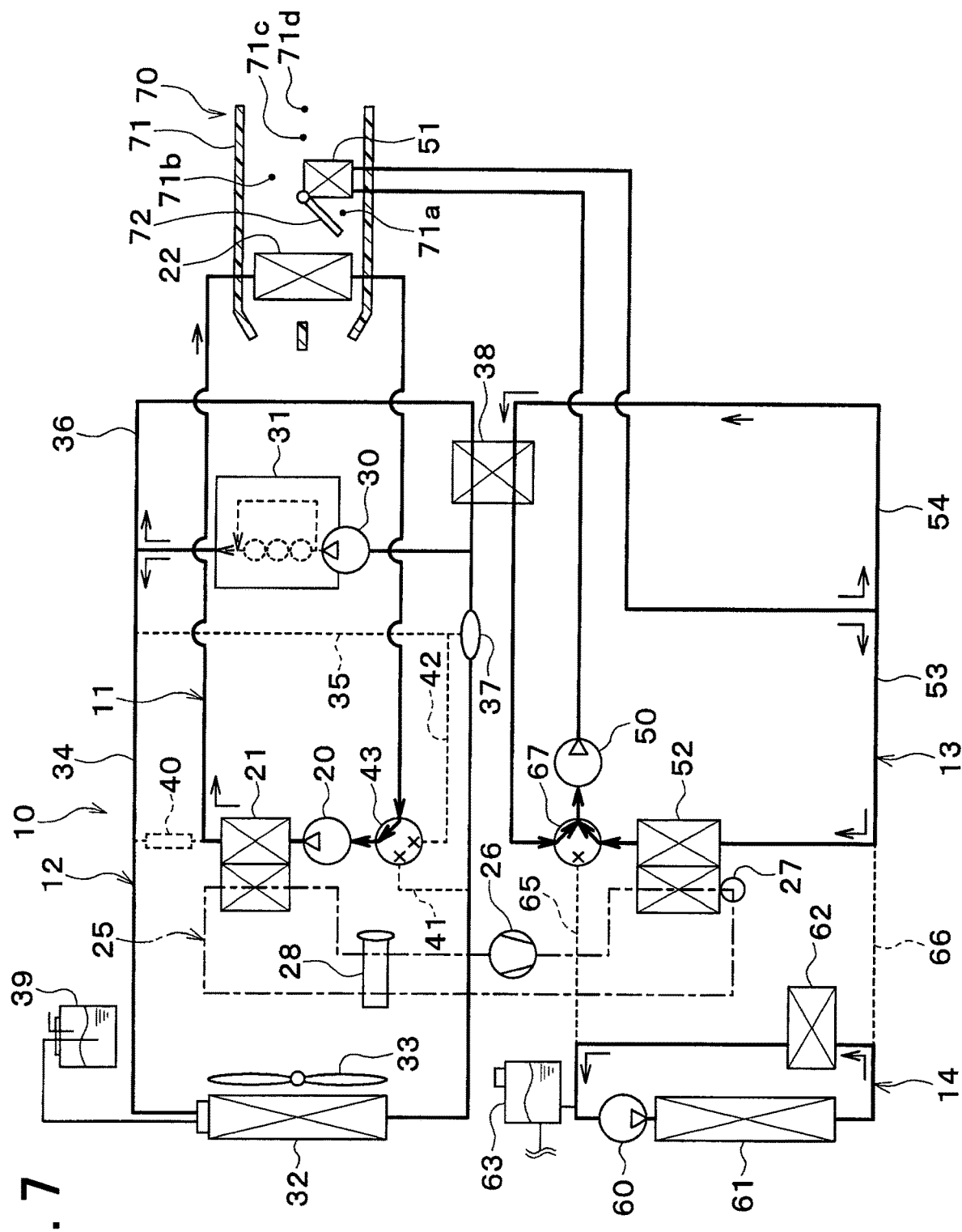
FIG. 7 is a diagram showing the state of a coolant flow in a heat-pump reheat dehumidification mode of the vehicle thermal management system in the first embodiment.

In the heat-pump reheat dehumidification heating mode, as shown in FIG. 7, the cooler-side valve 43 communicates the flow path on the coolant outlet side of the cooler core 22 with the flow path on the coolant inlet side of the chiller 21 and closes the engine-radiator flow path 41 and the engine heat-absorption flow path 42. The heater-side valve 67 communicates the flow path on the coolant outlet side of the condenser 52 and the coolant-coolant heat-exchanger flow path 54 with the flow path on the coolant inlet side of the heater core 51 and closes the radiator inlet-side flow path 65.

Thus, the coolant cooled by the chiller 21 flows through the cooler core 22, whereby the air flowing in the casing 71 of the interior air-conditioning unit 70 (air to be blown into the vehicle interior) is cooled and dehumidified by the cooler core 22.

At this time, when the outside air temperature is below the freezing point (0° C. or lower), the temperature of the coolant in the cooler cooling circuit 11 also becomes below the freezing point. Thus, to suppress the frost formation on the cooler core 22, the flow rate of the coolant flowing through the cooler core 22 is adjusted by the cooler pump 20.

In the condenser circuit 13, the coolant heated by the condenser 52 flows through the heater core 51, so that the air (air to be blown into the vehicle interior) flowing within the casing 71 of the interior air-conditioning unit 70 is heated by the heater core 51.

In the engine cooling circuit 12, the coolant heated by the engine 31 flows through the coolant-coolant heat exchanger 38. In the condenser circuit 13, the coolant heated by the coolant-coolant heat-exchanger flow path 54 flows through the heater core 51. In this way, the air (air to be blown into the vehicle interior) flowing within the casing 71 of the interior air-conditioning unit 70 is heated by the heater core 51.

In the condenser circuit 13, the coolant heated by the condenser 52 flows through the heater core 51, so that the air (air to be blown into the vehicle interior) flowing within the casing 71 of the interior air-conditioning unit 70 is heated by the heater core 51.

In the engine cooling circuit 12, the coolant heated by the engine 31 flows through the coolant-coolant heat exchanger 38, and thus the coolant heated by the coolant-coolant heat exchanger 38 also flows through the heater core 51.

(7) Engine Device Heating Mode

The engine device heating mode is an operation mode of warming up the engine 31 with the coolant heated by the condenser 52.

In the engine device heating mode, the condenser circuit 13 is brought into the switched state of the heat-pump reheat dehumidification heating mode shown in FIG. 7.

Thus, in the condenser circuit 13, the coolant heated by the condenser 52 is allowed to flow through the coolant-coolant heat-exchanger flow path 54.

The engine device heating mode is selected when the temperature of the coolant flowing into the coolant-coolant heat exchanger 38 in the engine cooling circuit 12 is lower than the temperature of the coolant flowing into the coolant-coolant heat exchanger 38 in the condenser circuit 13. In the engine cooling circuit 12, the coolant flowing through the coolant-coolant heat exchanger 38 is heated, and the heated coolant in the coolant-coolant heat-exchanger flow path 54 is allowed to flow through the engine 31, thereby heating (warming up) the engine 31.

FIG. 8 shows valve positions of the cooler-side valve 43 in the above-mentioned respective modes. Referring to FIG. 8, the cooler-core flow path is a flow path that leads from the coolant outlet of the cooler core 22 to the cooler-side valve 43. The chiller flow path is a flow path that leads from the cooler-side valve 43 to the coolant inlet of the chiller 21.

FIG. 9 shows valve positions of the heater-side valve 67 in the above-mentioned respective modes. Referring to FIG. 9, the condenser flow path is a flow path that leads from the coolant outlet of the condenser 52 to the heater-side valve 67. The heater-core flow path is a flow path that leads from the heater-side valve 67 to the coolant inlet of the heater core 51.

This embodiment includes the cooler-side valve 43 (switching device) that switches between an independent mode and a communication mode, and the controller 80 (switching-valve control unit 80*b*) that controls the operation of the cooler-side valve 43.

In the independent mode, the cooler cooling circuit 11 and the engine cooling circuit 12 allow the coolant to circulate independently therethrough. In the communication mode, the cooler cooling circuit 11 and the engine cooling circuit 12 communicates with each other such that the coolant flows between the chiller 21 and the engine radiator 32. When the temperature of the coolant in the engine cooling circuit 12 is lower than a predetermined temperature (first heat-medium temperature), the controller 80 (switching-valve control unit

80b) controls the operation of the cooler-side valve 43 to be switched to the communication mode.

In this way, when the temperature of the coolant in the engine cooling circuit 12 is low, the thermal management system is switched to the communication mode, thereby causing the coolant cooled by the chiller 21 to flow through the engine radiator 32 in the engine cooling circuit 12. Thus, the engine radiator 32 absorbs heat from the outside air, thereby enabling the air-heating of the vehicle interior (for example, in the outside-air heat-absorption heat-pump air-heating mode). Consequently, the engine radiator 32 can be effectively utilized to improve the air-heating performance of the vehicle interior.

Suppose that the amount of air to be blown to the heater core 51 is small, that the blowing of the air into the heater core 51 is stopped, or that the heater core 51 does not utilize the heat of the high-pressure side refrigerant in the refrigeration cycle 25. In these cases, the controller 80 (switching-valve control unit 80b) controls the operation of the cooler-side valve 43 to be switched to the independent mode, even if the temperature of the coolant in the engine cooling circuit 12 is lower than a predetermined temperature (first heat-medium temperature).

Thus, when there is a possibility that the vehicle interior is cooled, the cooler-side valve 43 can be switched to the independent mode, thereby preventing the heat from flowing from the outside air into the cooler cooling circuit 11 when cooling the vehicle interior.

The cooler-side valve 43 can implement the cooler-core communication mode of communicating the cooler cooling circuit 11 with the engine cooling circuit 12 in the communication mode such that the heat medium flows between the chiller 21 and the cooler core 22.

Thus, in the cooler core communication mode, the engine radiator 32 absorbs heat from the outside air, and the cooler core 22 can absorb heat from the air to be blown into the vehicle interior, so that heat-pump air-heating can be performed with an adequate heating capacity while dehumidifying by the cooler core 22 (for example, in the outside-air heat-absorption type heat-pump air-heating mode).

That is, even if the amount of heat recoverable by the cooler core 22 (an amount of sensible heat corresponding to a decrease in the temperature of the ventilation air+an amount of condensed latent heat during dehumidification) is inadequate as a heat-absorption source for heat-pump air heating, the engine radiator 32 absorbs heat from the outside air and thereby can compensate for the heat-absorption source.

Consequently, the thermal management system in this embodiment can prevent an occupant from feeling uncomfortable due to inadequate air-heating during the dehumidification, or can prevent the visibility from deteriorating due to the occurrence of fogging of a window glass.

For example, during dehumidifying and air-heating of the vehicle interior in the communication mode, the controller 80 (switching-valve control unit 80b) controls the operation of the cooler-side valve 43 to be in the cooler-core communication mode in the situation below: when a difference between the temperature of the blown air from the cooler core 22 and the target cooler-core blowing temperature (first target blowing temperature) TCO is lower than a predetermined value, and the temperature of the blown air from the heater core 51 is lower than the target heating temperature TAO by a predetermined temperature or more; or when the air-heating performance does not satisfy the predetermined performance.

Thus, when the amount of heat recoverable by the cooler core 22 is inadequate for the heat absorption source of the heat-pump air-heating, the cooler-core communication mode can be set, causing the heat absorbed from the outside air in the engine radiator 32 to compensate for the heat absorption source, thereby ensuring the adequate air-heating capacity.

That is, the shortage of the air-heating capacity can be compensated without increasing the amount of heat by reducing the efficiency of the compressor 26 or without using an auxiliary heat source, such as an electric heater, so that the adequate air-heating capacity can be ensured without increasing the energy consumption.

For example, in the cooler-core communication mode, the controller 80 (switching-valve control unit 80b) adjusts the flow rate of the coolant in the engine radiator 32 by controlling the operation of the cooler-side valve 43, or adjusts the flow rate of the refrigerant in the refrigeration cycle 25 by controlling the operation of the compressor 26 and the like. Specifically, the controller 80 performs the control in such a manner that a temperature in connection with the temperature of the blown air from the cooler core 22 approaches the first target blowing temperature TCO, and that a temperature in connection with the temperature of the blown air from the heater core 51 approaches a second target blowing temperature TAO.

In this way, both the temperature of the blown air from the cooler core 22 and the temperature of the blown air from the heater core 51 can be controlled properly, thereby appropriately performing the dehumidification heating.

The cooler-side valve 43 is capable of communicating the cooler cooling circuit 11 with the engine cooling circuit 12 such that the coolant flows between the cooler core 22 and the engine radiator 32.

Thus, the outside cold air can be used to cool and dehumidify the air in the cooler core 22, thereby achieving the power saving during the air-cooling and dehumidification (for example, in the outside-air heat-absorption type heat-pump air-heating mode, and in the outside-air heat-absorption type heat-pump air-heating mode (with the engine exhaust-heat assist)).

In this embodiment, when the temperature of the coolant in the engine cooling circuit 12 exceeds a predetermined temperature (second heat-medium temperature) in the communication mode, the controller 80 (switching-valve control unit 80b) controls the operation of the cooler-side valve 43 to be switched to the independent mode.

When the temperature of the coolant in the engine cooling circuit 12 becomes high, this embodiment can prevent the low-pressure side refrigerant from being at a high temperature due to the flow of the high-temperature coolant through the chiller 21, and further preventing the malfunction of the refrigeration cycle 25.

When the temperature of the coolant in the engine cooling circuit 12 becomes high, the exhaust heat from the engine 31 can be used to heat the air in the heater core 51, thus achieving the energy saving for the air-heating (for example, in the dehumidification air-heating mode).

This embodiment further includes the communication flow path 40 and the reserve tank 39. The communication flow path 40 communicates the cooler cooling circuit 11 with the engine cooling circuit 12 in either the independent mode or the communication mode. The reserve tank 39 is disposed in the engine cooling circuit 12 or the cooler cooling circuit 11 and stores the coolant therein.

Thus, since the cooler cooling circuit 11 and the engine cooling circuit 12 communicate with each other via the communication flow path 40, the reserve tank 39 disposed in the engine cooling circuit 12 can adjust the pressures of the coolants in both the engine cooling circuit 12 and the cooler cooling circuit 11. Thus, another reserve tank does not need to be provided in the cooler cooling circuit 11, thus simplifying the configuration of the thermal management system.

The coolant temperature in the engine cooling circuit 12 is normally in a range of 80 to 110° C. in most cases, so that the coolant expands to raise the pressure of the coolant in the circuit. On the other hand, the coolant temperature in the cooler cooling circuit 11 is normally near 0° C., causing the contraction of the coolant.

The communication between the cooler cooling circuit 11 and the engine cooling circuit 12 via the communication flow path 40 reduces an increase volume of the coolant in the engine cooling circuit 12, and reduces a rise of the pressure of the coolant in the engine cooling circuit 12. Consequently, the pressure proof design for the engine radiator 32, the engine devices, and the like can be simplified, thereby improving the lifetime of the devices.

In this embodiment, the communication flow path 40 communicates a part of the cooler cooling circuit 11 located on the coolant outlet side of the cooler pump 20 and on the coolant inlet side of the cooler core 22 with a part of the engine cooling circuit 12 located on the coolant discharge side of the engine pump 30 and on the coolant inlet side of the engine radiator 32.

Thus, the cooler cooling circuit 11 and the engine cooling circuit 12 communicate with each other at the parts where the coolant pressure is high, thereby making it possible to reduce the pressure difference between the cooler cooling circuit 11 and the engine cooling circuit 12. Thus, the reserve tank 39 disposed in the cooling circuit 12 can appropriately adjust the pressures of the coolants in both the engine cooling circuit 12 and the cooler cooling circuit 11.

In this embodiment, the engine-radiator flow path 41 is included to communicate the cooler cooling circuit 11 with the engine cooling circuit 12.

The cooler-side valve 43 switches between a state in which the coolant in the engine cooling circuit 12 flows through the engine-radiator flow path 41 and a state in which the coolant does not flow therethrough, thereby switching between the independent mode and the communication mode.

Thus, such a simple configuration can switch between the independent mode and the communication mode.

In this embodiment, the controller 80 (switching-valve control unit 80b and compressor control unit 80c) stops the compressor 26 while controlling the operation of the cooler-side valve 43 so as to cause the coolant to flow between the cooler core 22 and the engine radiator 32 when the temperature of the coolant in the engine cooling circuit 12 is lower than a predetermined temperature (third heat-medium temperature), and an outside air temperature is lower than the predetermined temperature (first outside-air temperature).

Thus, when the outside air temperature is low, the air can be cooled and dehumidified by the cooler core 22 using the cold heat of the outside air (for example, in the outside-air usage dehumidification mode). Thus, the power consumption of the compressor 26 can be reduced.

In this operating state, the air can be cooled and dehumidified by the cooler core 22 even when the suction port mode for the air-conditioning is the inside-air circulation mode, thereby suppressing the invasion of dirty outside air and pollen into the vehicle interior, and further improving the comfort for the occupant.

This embodiment includes the radiator bypass flow path 35 through which the coolant in the engine cooling circuit 12 flows bypassing the engine radiator 32 and the engine heat-absorption flow path 42 that couples the radiator bypass flow path 35 with the cooler-side valve 43. The cooler-side valve 43 switches between a state in which the coolant in the engine cooling circuit 12 flows through the radiator bypass flow path 35 and a state in which the coolant does not flow therethrough.

In this way, the coolant in the engine cooling circuit 12 is switched to a state of flowing through the radiator bypass flow path 35, so that the coolant can flow between the chiller 21 and the engine 31.

Thus, a heat pump operation can be performed to absorb the exhaust heat from the engine 31 in the chiller 21, so that the air can be heated by the heater core 51 using the exhaust heat from the engine 31 (for example, in the engine heat-absorption type heat-pump air-heating mode).

In this embodiment, when the outside air temperature is lower than a predetermined temperature (second outside air temperature), the controller 80 (switching-valve control unit 80b) controls the operation of the cooler-side valve 43 to switch to the state in which the coolant in the engine cooling circuit 12 flows through the radiator bypass flow path 35.

Thus, even when the temperature of the coolant in the engine cooling circuit 12 is low, the exhaust heat from the engine 31 can be used to heat the air in the heater core 51, thus achieving the energy saving for the air-heating (for example, in the engine heat-absorption type heat-pump air-heating mode).

In this operating state, the temperature of the air heated by the heater core 51 can be set higher than that of the coolant in the engine cooling circuit 12. At this time, the temperature of the coolant in the engine cooling circuit 12 is lowered, whereby the amount of heat transferred from the engine 31 to the coolant can be increased to thereby improve the air-heating performance of the vehicle interior.

In this embodiment, the controller 80 (request outputting portion 80f) in the communication mode outputs, to the engine controller 99, a request for increasing the amount of exhaust heat from the engine 31, a request for increasing the operating rate of the engine 31, a request for increasing the temperature of the coolant in the engine cooling circuit 12, or a request for reducing the efficiency of the engine 31. Such control by the controller 80 is performed in the communication mode when the refrigerant discharge amount of the compressor 26 is a predetermined amount or more, or the number of revolutions of the compressor 26 is a predetermined value or more, and when the temperature of the blown air into the vehicle interior is lower than a predetermined air temperature. Alternatively, the controller 80 (request outputting portion 80f) outputs, to the engine controller 99, the request for increasing the amount of exhaust heat from the engine 31, the request for increasing the operating rate of the engine 31, the request for increasing the coolant temperature in the engine cooling circuit 12, or the request for reducing the efficiency of the engine 31. Such control by the controller 80 is performed in the communication mode when the temperature of the coolant flowing through the engine radiator 32 or chiller 21 is lower than a predetermined coolant temperature (fourth heat-medium temperature), and when the temperature of the coolant in the engine cooling circuit 12 is lower than a predetermined temperature (fifth heat-medium temperature).

Thus, the temperature of the coolant in the engine cooling circuit 12 is increased when the frost formation occurs on the engine radiator 32 and when the temperature of the coolant in the engine cooling circuit 12 is low, thereby making it possible to ensure the heat source required for the air-heating of the vehicle interior or the defrosting of the engine radiator 32 and further to retain the air-heating performance of the vehicle interior.

Whether the frost is formed on the engine radiator 32 or not can be determined based on the coolant temperature in the engine radiator 32, the coolant temperature in the chiller 21, the refrigerant temperature in the chiller 21, or an amount of divergence from the correlation between the blowing air temperature into the vehicle interior and a workload of the compressor 26.

This embodiment also includes the heater-side valve 67 that selectively causes either the heater-side coolant heated by the condenser 52 or the heater-side coolant heated by the coolant-coolant heat exchanger 38 to flow into the heater core 51.

The controller 80 (switching-valve control unit 80b) in the communication mode controls the operation of the heater-side valve 67 to cause the heater-side coolant heated by the condenser 52 to flow into the heater core 51.

The controller 80 (switching-valve control unit 80b) in the communication mode controls the operation of the heater-side valve 67 to cause the heater-side coolant heated by the coolant-coolant heat exchanger 38 to flow into the heater core 51 when the temperature of the coolant in the engine cooling circuit 12 is equal to or higher than a predetermined temperature (fifth heat-medium temperature).

Thus, the high-pressure side refrigerant and the air have their heat exchanged therebetween not directly but via the heater-side coolant, which can suppress the occurrence of inconveniences, including the leakage of the refrigerant into the vehicle interior. As a result, more options for selecting the refrigerant can be created.

When the temperature of the coolant in the engine cooling circuit 12 is low, the vehicle interior is air-heated by the heat-pump operation in the refrigeration cycle 25, making it possible to ensure the comfort for an occupant (for example, in the outside-air heat-absorption type heat-pump air-heating mode, or in the engine heat-absorption type heat-pump air-heating mode).

When the temperature of the coolant in the engine cooling circuit 12 becomes high, the exhaust heat from the engine 31 can be used to heat the air in the heater core 51, thus achieving the energy saving for the air-heating (for example, in the dehumidification air-heating mode).

This embodiment further includes the coolant-coolant heat exchanger 38 that exchanges heat between the coolant in the engine cooling circuit 12 and the heater-side coolant.

Thus, the coolants flowing through the cooler cooling circuit 11 and engine cooling circuit 12 are not mixed with the heater-side coolant flowing through the condenser circuit 13 in the heat transfer device 38. Because of this, the coolants and the heater-side coolant can be fluids with different physical properties. Thus, more options for selecting the coolant and the heater-side coolant can be created.

Furthermore, the coolant is never mixed with the heater-side coolant, which can prevent foreign matter in one circuit from adversely affecting the other circuit.

In this embodiment, the heater-side valve 67 switches between a state in which the heater-side coolant circulates independently through the condenser circuit 13 and the radiator circuit 14 and a state in which the condenser circuit 13 communicates with the radiator circuit 14 so as to allow the heater-side coolant to flow between the condenser 52 and the heater-side radiator 61.

Thus, when the condenser circuit 13 communicates with the radiator circuit 14, the heater-side coolant heated by the high-pressure side refrigerant in the condenser 52 can be cooled with the outside air in the heater-side radiator 61, thereby performing the air-cooling of the vehicle interior.

Second Embodiment

Figure 10:
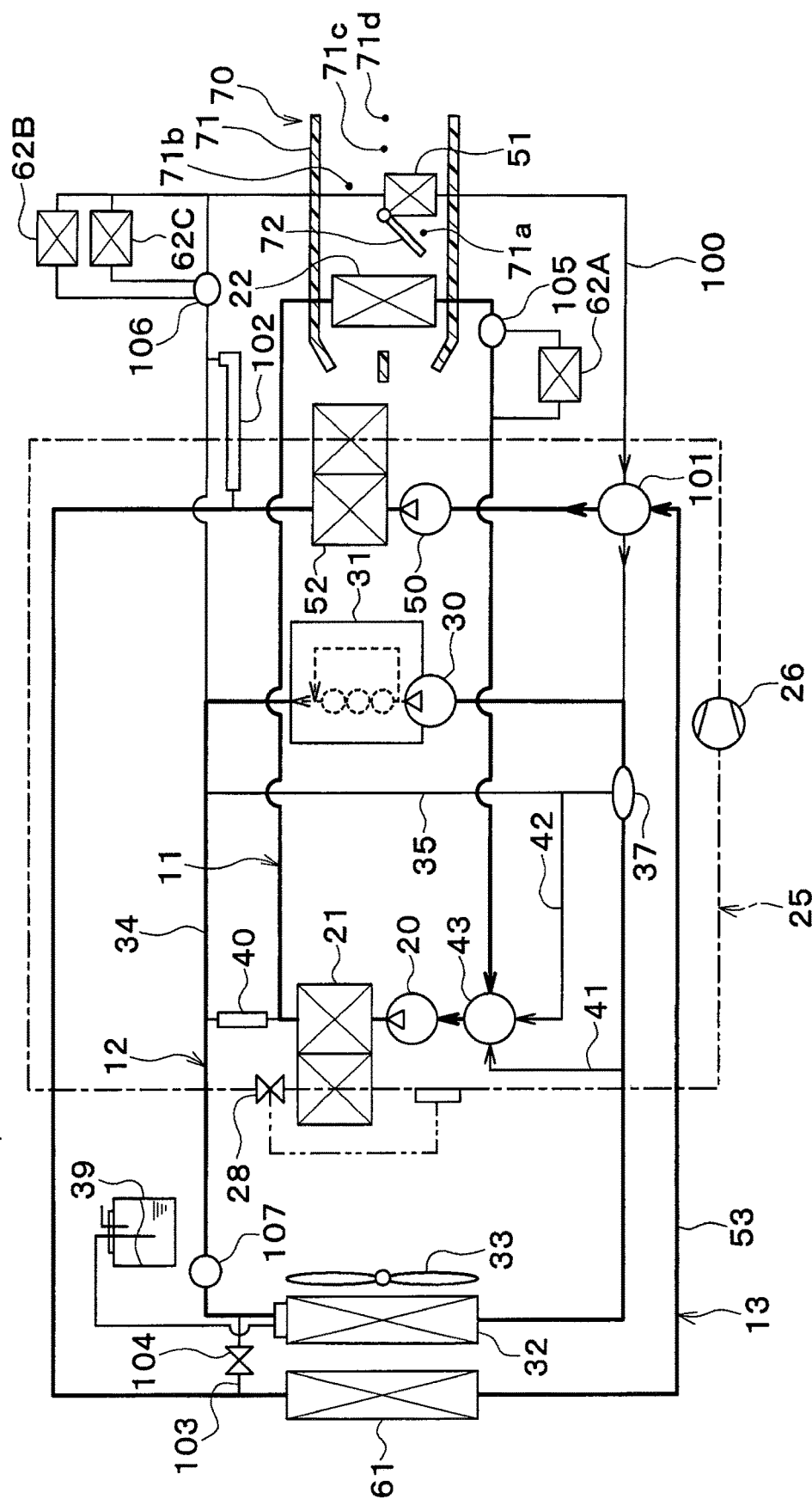
FIG. 10 is an entire configuration diagram of a vehicle thermal management system in a second embodiment of the present disclosure.

In the above-mentioned embodiment, the coolant in the engine cooling circuit 12 and the coolant in the condenser circuit 13 have their heat exchanged therebetween via the coolant-coolant heat exchanger 38. In this embodiment, as shown in FIG. 10, the engine cooling circuit 12 and the condenser circuit 13 can be directly connected with each other.

In this embodiment, a heater-core flow path 100 is connected to the circulation flow path 34 in the engine cooling circuit 12. The heater-core flow path 100 is a coolant flow path in which the heater core 51 is disposed.

One end of the heater-core flow path 100 is connected to a part on the coolant outlet side of the engine 31 in the circulation flow path 34. Further, the one end of the heater-core flow path 100 is connected to a part on the coolant suction side of the engine pump 30 in the circulation flow path 34.

In this embodiment, the heater pump 50, the condenser 52, and the heater-side radiator 61 are arranged in the circulation flow path 53 of the condenser circuit 13 to allow the coolant to circulate therethrough in this order.

The circulation flow path 53 in the condenser circuit 13 is connected to the heater-core flow path 100 in the engine cooling circuit 12 via a heater-side valve 101. The heater-side valve 101 is a four-way valve that has four ports (first to fourth ports).

The first port of the heater-side valve 101 is connected to the flow path on the coolant outlet side of the heater core 51. The second port of the heater-side valve 101 is connected to the flow path on the coolant suction side of the engine pump 30. In other words, the second port of the heater-side valve 101 is connected to the flow path on the coolant inlet side of the engine 31.

The third port of the heater-side valve 101 is connected to the flow path on the coolant outlet side of the heater-side radiator 61. The fourth port of the heater-side valve 101 is connected to the flow path on the coolant suction side of the heater pump 50. In other words, the fourth port of the heater-side valve 101 is connected to the flow path on the coolant inlet side of the heater core 51.

The heater-side valve 101 has a valve body that switches connection states among the first to fourth ports. The heater-side valve 101 is a coolant-flow switching portion that switches the flow of the coolant by a switching operation of the valve body.

The heater-side communication flow path 102 is a coolant flow path that communicates a part of the circulation flow path 53 in the condenser circuit 13 located on the coolant outlet side of the condenser 52 and on the coolant inlet side of the heater-side radiator 61 with a part of the heater-core flow path 100 in the engine cooling circuit 12 located on the coolant inlet side of the heater core 51.

A radiator communication flow path 103 is a coolant flow path that communicates a part of the circulation flow path 34 in the engine cooling circuit 12 located on the coolant outlet side of the engine 31 and on the coolant inlet side of the engine radiator 32 with a part of the circulation flow path 53 in the condenser circuit 13 located on the coolant outlet side of the condenser 52 and on the coolant inlet side of the heater-side radiator 61.

A radiator communication valve 104 is disposed in the radiator communication flow path 103. The radiator communication valve 104 is a flow-path opening-closing device that opens and closes the radiator communication path 103. When the radiator communication valve 104 opens the radiator communication flow path 103, air can be easily released from the heater-side radiator 61.

The radiator communication valve 104 opens the radiator communication flow path 103, while the heater-side valve 101 communicates the coolant outlet side of the heater-side radiator 61 with the coolant suction side of the engine pump 30. In such a case, the coolant having flowed out of the engine 31 flows and circulates through the engine radiator 32 and the heater-side radiator 61 in parallel. Thus, the coolant having flowed out of the engine 31 is cooled not only by the engine radiator 32, but also by the heater-side radiator 61, thereby making it possible to improve the cooling performance for the engine 31 and further to improve the output from the engine 31.

In the cooler cooling circuit 11 and the engine cooling circuit 12, three coolant circulation devices 62A, 62B, and 62C are arranged.

In an example shown in FIG. 10, one coolant circulation device 62A is disposed in a coolant flow path branched from the circulation flow path in the cooler cooling circuit 11. Other two coolant circulation devices 62B and 62C are disposed in a coolant flow path branched from the heater-core flow path 100 in the engine cooling circuit 12. Valves 105 and 106 are arranged in respective branch portions of these coolant flow paths. The flow rates of the coolants through the coolant circulation devices 62A, 62B, and 62C can be controlled by adjusting the opening degrees of the valves 105 and 106.

That is, in the example shown in FIG. 10, the coolant circulation devices 62A, 62B, and 62C are arranged in parallel with either the cooler cooling circuit 11 or the engine cooling circuit 12. The coolant circulation devices 62A, 62B, and 62C may be arranged in series with either the cooler cooling circuit 11 or the engine cooling circuit 12.

An engine-radiator flow regulating valve 107 is disposed on the coolant inlet side of the engine radiator 32 in the circulation flow path 34 of the engine cooling circuit 12. The engine-radiator flow regulating valve 107 is an engine-radiator flow rate adjustment portion that adjusts the flow rate of the coolant in the engine radiator 32.

(1) Air-Cooling Mode and Dehumidification Heating Mode

Figure 11:
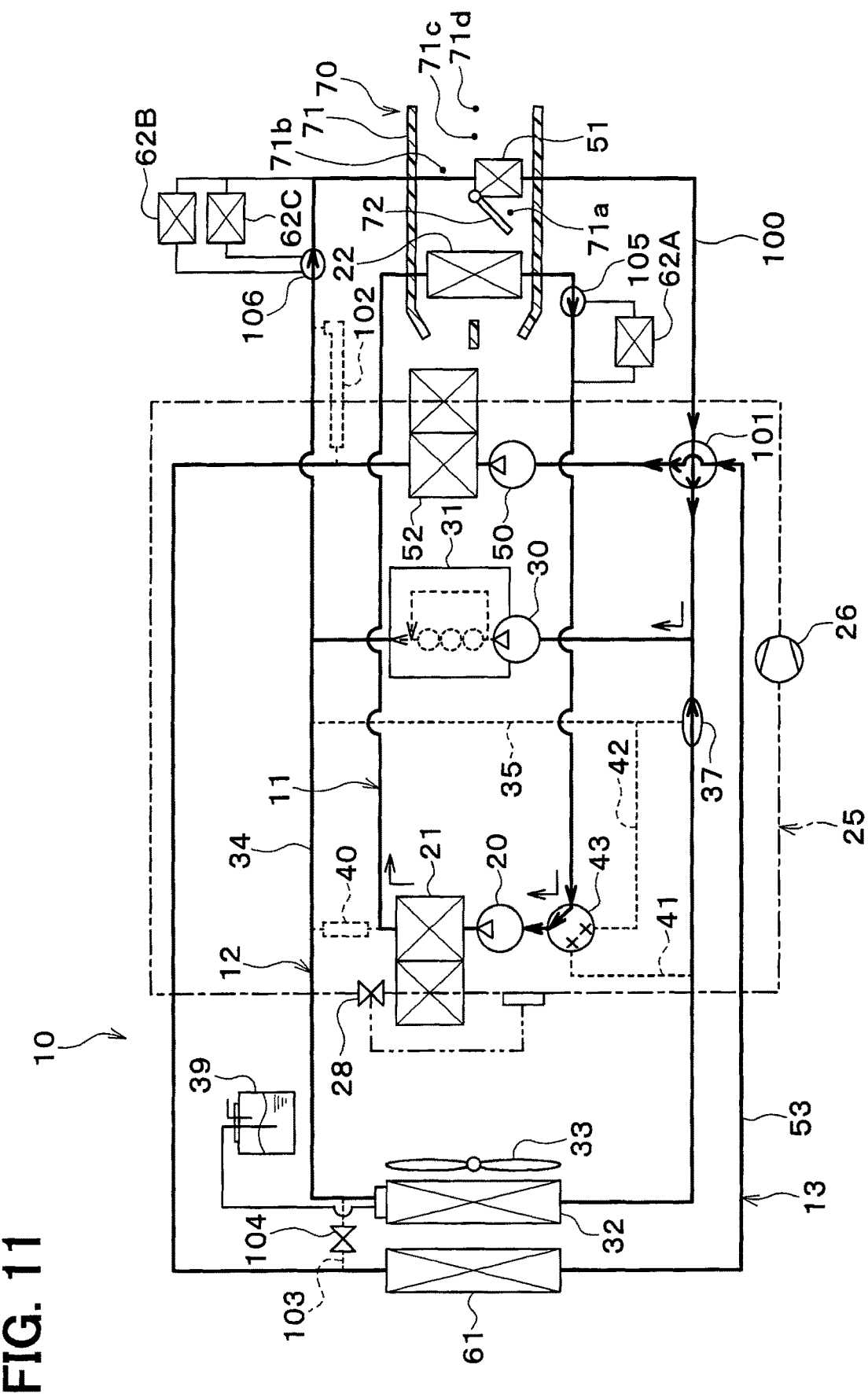
FIG. 11 is a diagram showing the states of coolant flows in an air-cooling mode and a dehumidification heating mode of the vehicle thermal management system in the second embodiment.

In the air-cooling mode and the dehumidification heating mode, as shown in FIG. 11, the cooler-side valve 43 communicates the flow path on the coolant outlet side of the cooler core 22 with the flow path on the coolant inlet side of the chiller 21 and closes the engine-radiator flow path 41 and the engine heat-absorption flow path 42. The heater-side valve 101 communicates the flow path on the coolant-outlet side of the heater core 51 with the flow path on the coolant inlet side of the engine 31, while communicating the flow path on the coolant outlet side of the heater-side radiator 61 with the flow path on the coolant inlet side of the condenser 52.

Thus, the cooler cooling circuit 11, the engine cooling circuit 12, and the condenser circuit 13 allow the coolant to circulate independently therethrough.

In the cooler cooling circuit 11, the coolant is cooled by the chiller 21 and then is allowed to flow through the cooler core 22, so that the air (air to be blown into the vehicle interior) flowing within the casing 71 of the interior air-conditioning unit 70 is cooled by the cooler core 22.

In the engine cooling circuit 12, the coolant heated by the engine 31 is allowed to flow through the heater core 51, so that the air (air to be blown into the vehicle interior) flowing within the casing 71 of the interior air-conditioning unit 70 is heated by the heater core 51.

The coolant heated by the condenser 52 is allowed to flow through the heater-side radiator 61, thereby dissipating the exhaust heat from the condenser 52 and from the coolant circulation device 62 into the outside air in the heater-side radiator 61.

(2) Outside-Air Heat-Absorption Type Heat-Pump Air-Heating Mode

Figure 12:
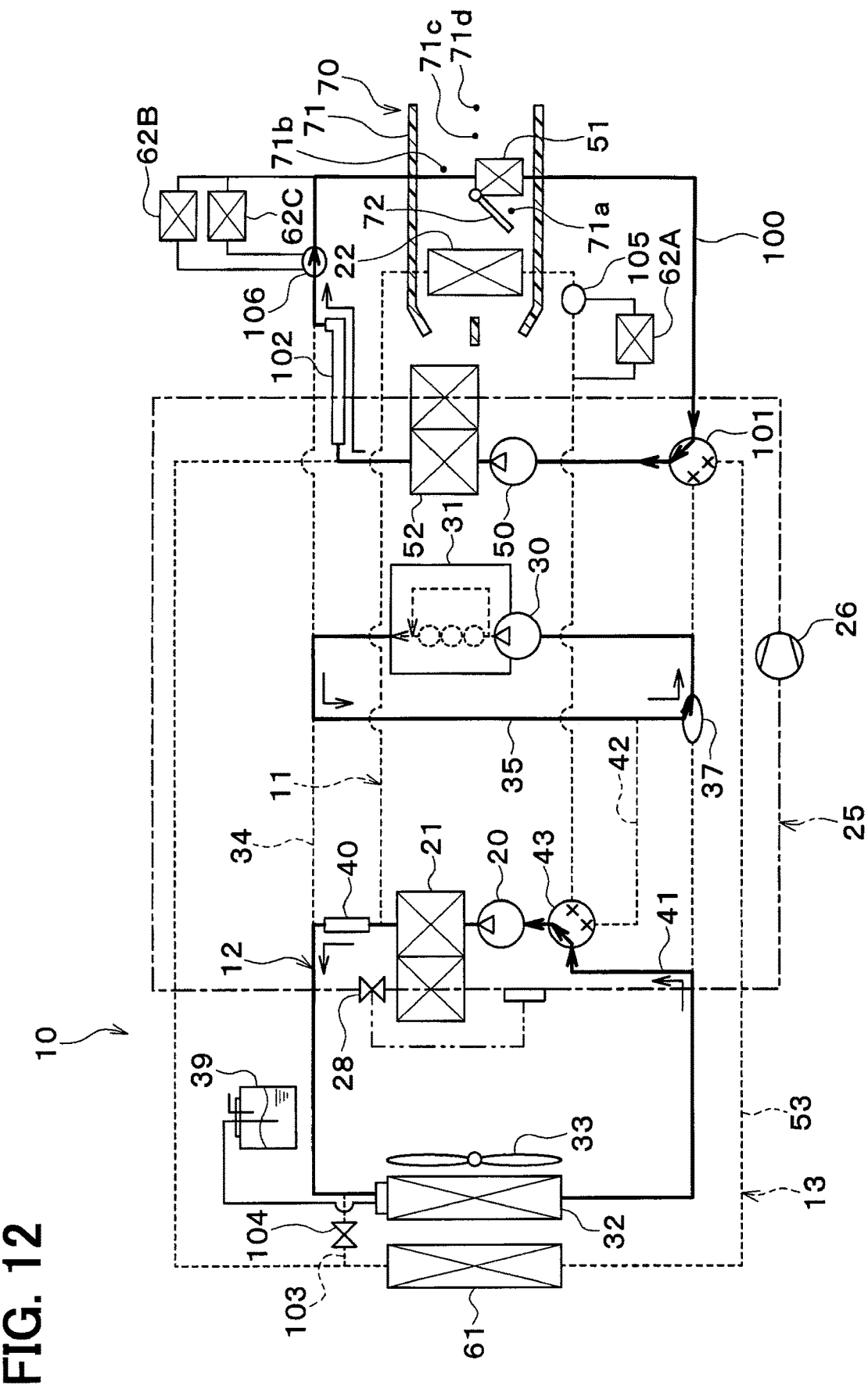
FIG. 12 is a diagram showing the state of a coolant flow in an outside-air heat-absorption type heat-pump air-heating mode of the vehicle thermal management system in the second embodiment.

In the outside-air heat-absorption type heat-pump air-heating mode, as shown in FIG. 12, the cooler-side valve 43 communicates the engine-radiator flow path 41 with the flow path on the coolant inlet side of the chiller 21, and closes the flow path on the coolant outlet side of the cooler core 22 and the engine heat-absorption flow path 42. The heater-side valve 101 communicates the flow path on the coolant-outlet side of the heater core 51 with the flow path on the coolant inlet side of the condenser 52 and closes the flow path on the coolant outlet side of the heater-side radiator 61 with the flow path on the coolant inlet side of the engine 31.

The outside-air heat-absorption type heat-pump air-heating mode is selected when the coolant in the engine cooling circuit 12 is at a low temperature (for example, of lower than 60° C.) that cannot be directly used for air-heating. Therefore, in the outside-air heat-absorption type heat-pump air-heating mode, the thermostat 37 opens the radiator bypass flow path 35 and closes the flow path on the engine radiator 32 side.

Thus, the coolant cooled by the chiller 21 flows through the engine radiator 32, whereby the coolant absorbs heat from the outside air in the engine radiator 32.

When the dehumidification is unnecessary, the cooler-side valve 43 interrupts the circulation of the coolant to the cooler core 22.

When the dehumidification is necessary, the cooler-side valve 43 allows the coolant to circulate to the cooler core 22. Thus, the coolant cooled by the chiller 21 flows through the cooler core 22, whereby the air flowing in the casing 71 of the interior air-conditioning unit 70 (air to be blown into the vehicle interior) is cooled and dehumidified by the cooler core 22.

At this time, when the outside-air temperature is below the freezing point of water (0° C.), the flow rate of the coolant at the cooler core 22 is adjusted to suppress the frost formation at the cooler core 22. In other cases, the amount of heat absorption in the engine radiator 32 is controlled by adjusting the flow rate of the coolant through the engine radiator 32 to prevent the temperature of the coolant in the cooler core 22 from becoming extremely high.

The coolant heated by the condenser 52 is allowed to flow through the heater core 51, so that the air (air to be blown into the vehicle interior) flowing within the casing 71 of the interior air-conditioning unit 70 is heated by the heater core 51.

(3) Another Outside-Air Heat-Absorption Type Heat-Pump Air-Heating Mode (Engine Exhaust-Heat Assist)

Figure 13:
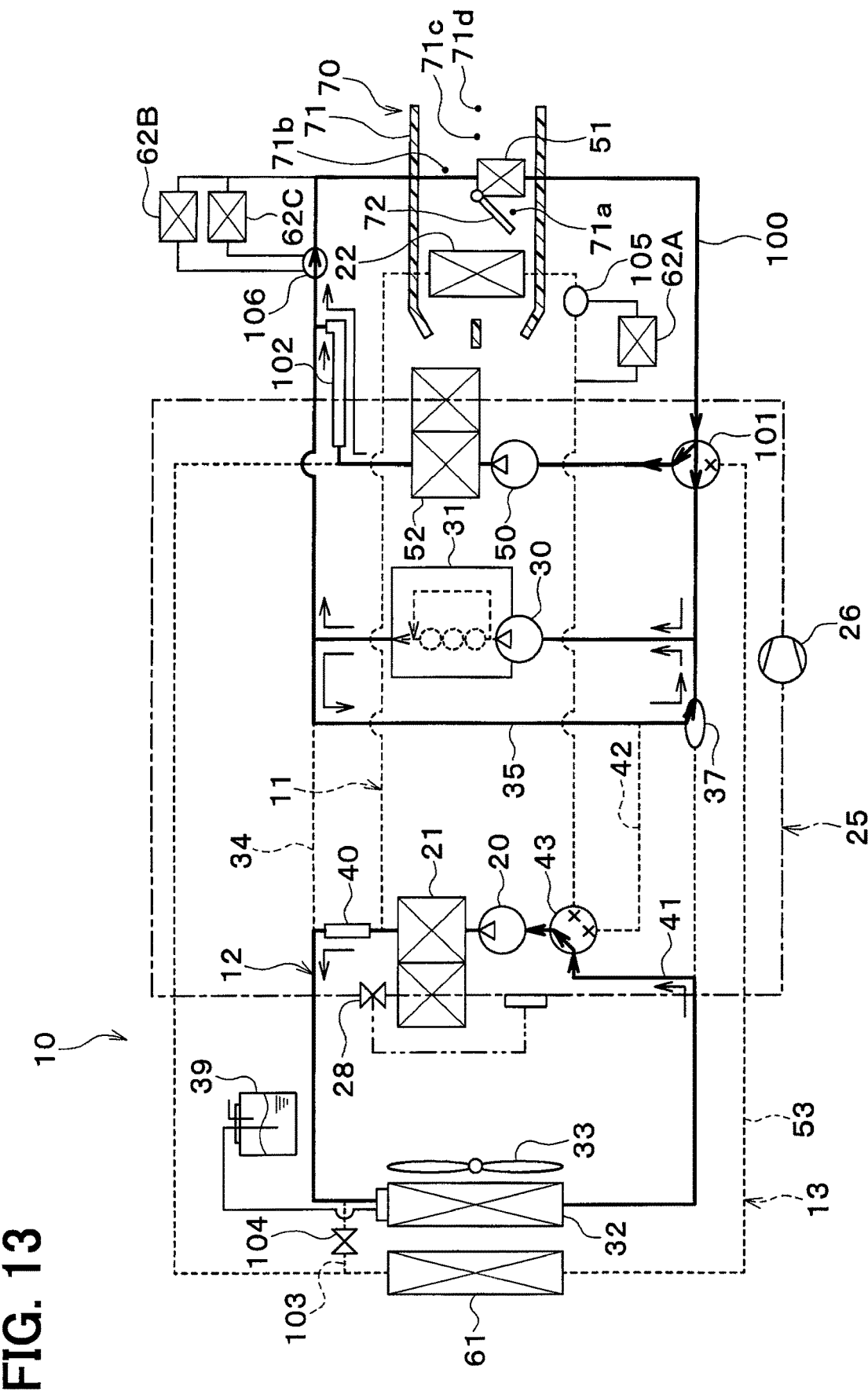
FIG. 13 is a diagram showing the state of a coolant flow in an outside-air heat-absorption type heat-pump air-heating mode (with engine exhaust-heat assist) of the vehicle thermal management system in the second embodiment.

In the outside-air heat-absorption type heat-pump air-heating mode (with the engine exhaust-heat assist), as shown in FIG. 13, the cooler-side valve 43 communicates the engine-radiator flow path 41 with the flow path on the coolant inlet side of the chiller 21, and closes the flow path on the coolant outlet side of the cooler core 22 and the engine heat-absorption flow path 42. The heater-side valve 101 communicates the flow path on the coolant outlet side of the heater core 51 with the flow path located on the coolant inlet side of the condenser 52 and the flow path located on the coolant inlet side of the engine 31, and closes the flow path on the coolant outlet side of the heater-side radiator 61.

The outside-air heat-absorption type heat-pump air-heating mode (with the engine exhaust-heat assist) is selected when the coolant in the engine cooling circuit 12 is at a low temperature (for example, of lower than 60° C.) that cannot be directly used for air-heating. Therefore, in the outside-air heat-absorption type heat-pump air-heating mode (with the engine exhaust-heat assist), the thermostat 37 opens the radiator bypass flow path 35 and closes the flow path on the side of the engine radiator 32.

Thus, the coolant cooled by the chiller 21 flows through the engine radiator 32, whereby the coolant absorbs heat from the outside air in the engine radiator 32.

When the dehumidification is unnecessary, the cooler-side valve 43 interrupts the circulation of the coolant to the cooler core 22.

When the dehumidification is necessary, the cooler-side valve 43 allows the coolant to circulate to the cooler core 22. Thus, the coolant cooled by the chiller 21 flows through the cooler core 22, whereby the air flowing in the casing 71 of the interior air-conditioning unit 70 (air to be blown into the vehicle interior) is cooled and dehumidified by the cooler core 22.

At this time, when the outside-air temperature is below the freezing point of water (0° C.), the flow rate of the coolant at the cooler core 22 is adjusted to suppress the frost formation at the cooler core 22. In other cases, the amount of heat absorption in the engine radiator 32 is controlled by adjusting the flow rate of the coolant through the engine radiator 32 to prevent the temperature of the coolant in the cooler core 22 from becoming extremely high.

The coolant heated by the engine 31 and the coolant heated by the condenser 52 are allowed to flow through the heater core 51, so that the air (air to be blown into the vehicle interior) flowing within the casing 71 of the interior air-conditioning unit 70 is heated by the heater core 51.

The flow rate of the coolant or the like is controlled such that the amount of heat taken by the coolant from the engine 31 is set at a level that can just maintain the temperature of the coolant in the engine cooling circuit 12 within the predetermined temperature range. This arrangement can suppress the deterioration of the fuel efficiency due to a decrease in the temperature of the coolant, and can perform air-heating without enhancing an engine operating rate, thereby improving the fuel efficiency during the air heating.

(4) Engine Heat-Absorption Type Heat-Pump Air-Heating Mode

Figure 14:
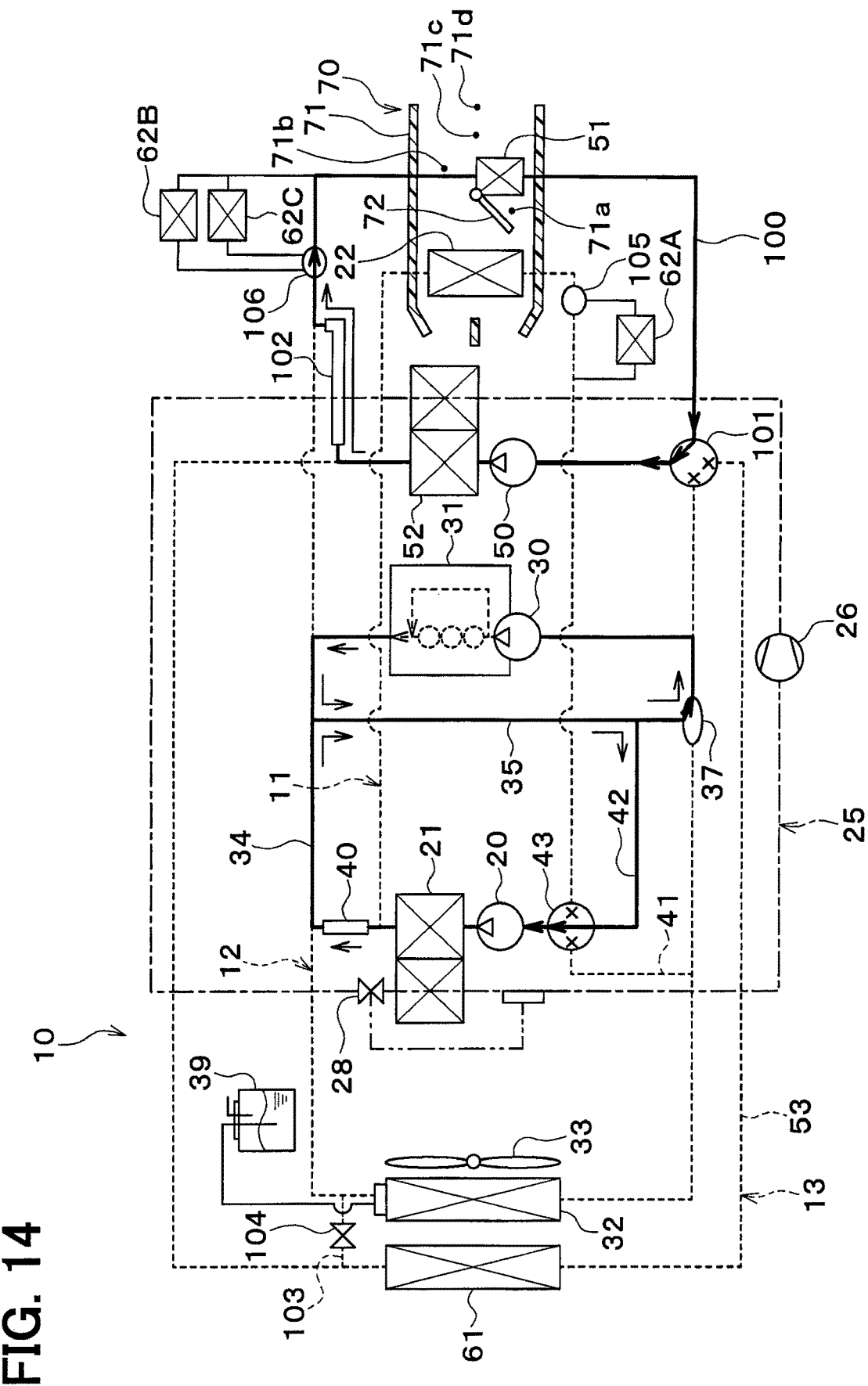
FIG. 14 is a diagram showing the state of a coolant flow in an engine heat-absorption type heat-pump air-heating mode of the vehicle thermal management system in the second embodiment.

In the engine heat-absorption type heat-pump air-heating mode, as shown in FIG. 14, the cooler-side valve 43 communicates the engine heat-absorption flow path 42 with the flow path on the coolant inlet side of the chiller 21, and closes the flow path on the coolant outlet side of the cooler core 22 and the engine-radiator flow path 41. The heater-side valve 67 communicates the flow path on the coolant outlet side of the heater core 51 with the flow path located on the coolant inlet side of the condenser 52, and closes the flow path on the coolant inlet side of the engine 31 and the flow path on the coolant outlet side of the heater-side radiator 61.

The engine heat-absorption type heat-pump air-heating mode is selected when the coolant in the engine cooling circuit 12 is at a low temperature (for example, of lower than 60° C.) that cannot be directly used for air-heating. Therefore, in the engine heat-absorption type heat-pump air-heating mode, the thermostat 37 opens the radiator bypass flow path 35 and closes the flow path on the side of the engine radiator 32.

Thus, the coolant heated by the engine 31 flows through the chiller 21, whereby the coolant absorbs exhaust heat from the engine 31 in the chiller 21.

The coolant heated by the condenser 52 is allowed to flow through the heater core 51, so that the air (air to be blown into the vehicle interior) flowing within the casing 71 of the interior air-conditioning unit 70 is heated by the heater core 51.

Third Embodiment

Figure 15:
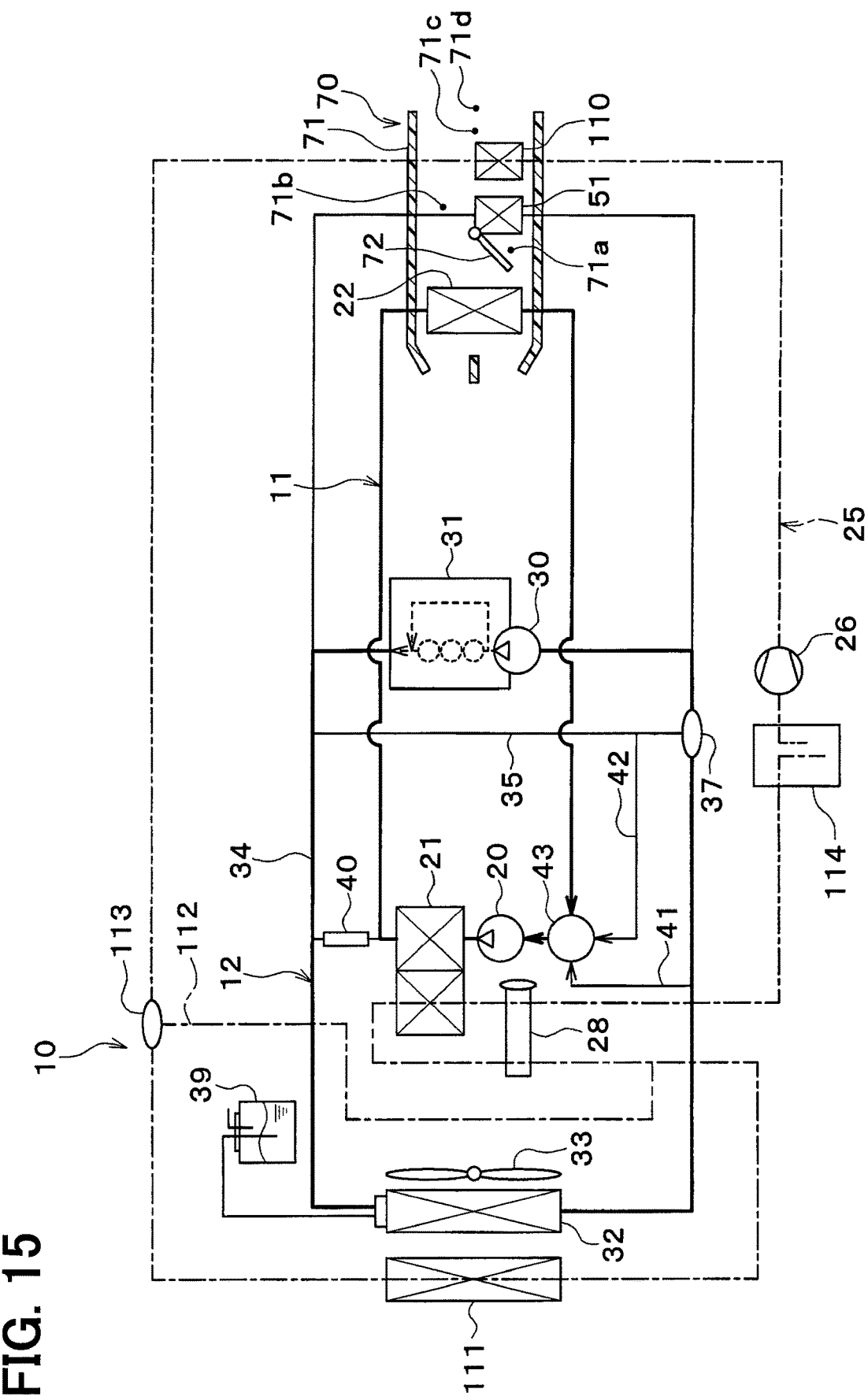
FIG. 15 is an entire configuration diagram of a vehicle thermal management system in a third embodiment of the present disclosure.

In the above-mentioned embodiments, the condenser 52 that exchanges heat between the high-pressure side refrigerant and the coolant is provided as a condenser for condensing the high-pressure side refrigerant in the refrigeration cycle 25. However, in this embodiment, as shown in FIG. 15, an interior condenser (air heating device) 110 and an exterior condenser 111 are provided as the condenser for the refrigeration cycle 25.

The interior condenser 110 and the exterior condenser 111 are arranged in series so as to cause the refrigerant to flow in this order in the refrigeration cycle 25.

The interior condenser 110 is an interior heat exchanger that heats the air to be blown into the vehicle interior while condensing the high-pressure side refrigerant by exchanging heat between the high-pressure side refrigerant discharged from the compressor 26 and the air to be blown into the vehicle interior. The interior condenser 110 is disposed on the downstream side in the air flow direction with respect to the heater core 51 in an air passage within the casing 71.

The exterior condenser 111 is an exterior heat exchanger that condenses the high-pressure side refrigerant discharged from the compressor 26 by exchanging the heat between the high-pressure side refrigerant and the outside air. The exterior condenser 111 is disposed in the engine room of the vehicle. The exterior condenser 111 receives the outside air blown by the exterior blower 33. The exterior condenser 111 is disposed on the upstream side in the outside-air flow direction with respect to the engine radiator 32.

The refrigeration cycle 25 includes a refrigerant bypass flow path 112 and a three-way valve 113. The refrigerant bypass flow path 112 is a refrigerant flow path through which the refrigerant having flowed out of the interior condenser 110 flows into the expansion valve 28 while bypassing the exterior condenser 111. That is, the three-way valve 113 is a refrigerant flow-rate ratio adjusting portion that adjusts the ratio of the flow rate of the refrigerant flowing through the exterior condenser 111 to that of the refrigerant flowing through the refrigerant bypass flow path 112.

The refrigeration cycle 25 includes an accumulator 114. The accumulator 114 is a gas-liquid separator that separates a gas-liquid two-phase refrigerant having flowed out of the chiller 21 into a gas-phase refrigerant and a liquid-phase refrigerant, and then causes the gas-phase refrigerant after the separation to flow out toward the compressor 26. The accumulator 114 serves as a refrigerant flow-rate adjustment portion that adjusts the flow rate of the refrigerant flowing through the refrigeration cycle 25.

This embodiment includes an interior condenser 110 that heats the air to be blown into the vehicle interior by exchanging heat between the high-pressure side refrigerant in the refrigeration cycle 25 and the air to be blown into the vehicle interior.

Thus, with the simple configuration, the air to be blown into the vehicle interior can be heated by using heat held in the high-pressure side refrigerant in the refrigeration cycle 25.

This embodiment includes the exterior condenser 111 that exchanges heat between the high-pressure side refrigerant and the outside air and the three-way valve 113 that adjusts the ratio of the flow rate of the high-pressure side refrigerant flowing through the interior condenser 110 to that of the high-pressure side refrigerant flowing through the exterior condenser 111.

Thus, when the high-pressure side refrigerant flows through the exterior condenser 111, the high-pressure side refrigerant can be cooled by the outside air in the exterior condenser 111. Consequently, the vehicle interior can be cooled in this way.

Fourth Embodiment

Figure 16:
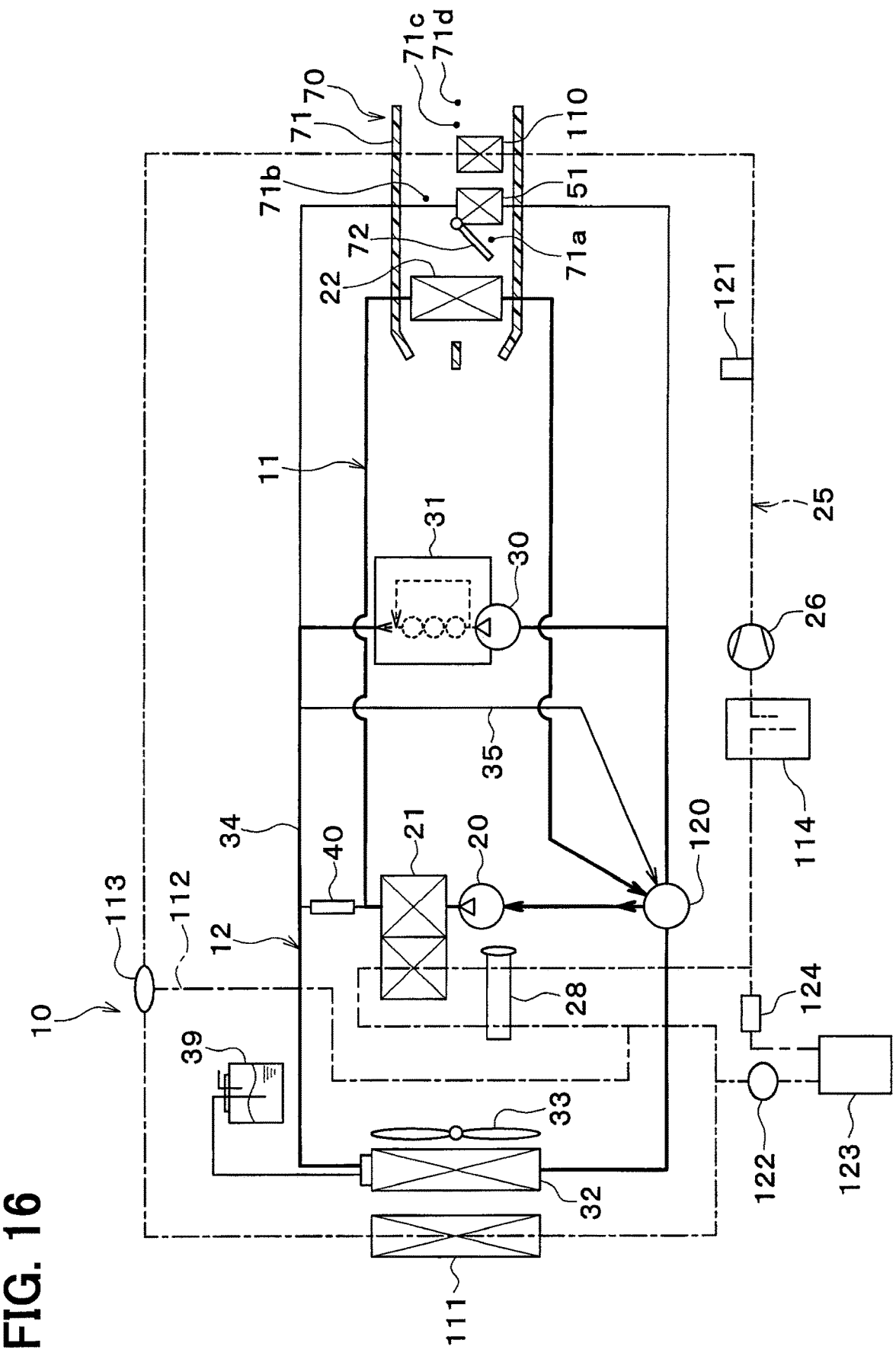
FIG. 16 is an entire configuration diagram of a vehicle thermal management system in a fourth embodiment of the present disclosure.

Although the above-mentioned embodiments include the cooler-side valve 43 configured of the four-way valve, a cooler-side valve 120 configured of a five-way valve is provided in this embodiment as shown in FIG. 16.

The cooler-side valve 120 also has a function of the thermostat 37 in the above-mentioned embodiments.

Among five ports of the cooler-side valve 120, the first port and the second port are connected to the coolant flow path in the cooler cooling circuit 11.

The third and fourth ports of the cooler-side valve 120 are connected to the circulation flow path 34 in the engine cooling circuit 12. The fifth port of the cooler-side valve 120 is connected to the radiator bypass flow path 35.

Specifically, the first port is connected to the coolant outlet side of the cooler core 22. The second port is connected to the coolant suction side of the cooler pump 20. In other words, the second port is connected to the coolant inlet side of the chiller 21.

The third port is connected to the coolant outlet side of the engine radiator 32. The fourth port is connected to the coolant suction side of the engine pump 30. In short, the fourth port is connected to the coolant inlet side of the engine 31. The fifth port is connected to the coolant outlet side of the radiator bypass flow path 35.

The cooler-side valve 120 has a valve body that switches connection states among the five ports. The cooler-side valve 120 is a coolant-flow switching portion (switching device) that switches the flow of the coolant by a switching operation of the valve body.

In the example of FIG. 16, the refrigeration cycle 25 includes a refrigerant temperature-pressure sensor 121, an electric expansion valve 122, a refrigerant circulation device 123, and a pressure regulating valve 124.

The refrigerant temperature-pressure sensor 121 is a detecting portion (detector) that detects the temperature and pressure of the high-pressure side refrigerant discharged from the compressor 26.

The electric expansion valve 122 is a decompressing portion (decompression device) that decompresses and expands the liquid-phase refrigerant flowing out of the interior condenser 110 and the exterior condenser 111.

The electric expansion valve 122 is a variable throttle mechanism that includes a valve body that has its variable throttle opening degree and an electric actuator that varies the throttle opening degree of the valve body. Note that the electric actuator also has its operation controlled by a control signal output from the controller 80.

A control signal output to the electric expansion valve 122 is determined such that the pressure of the high-pressure side refrigerant discharged from the compressor 26 approaches a target high pressure. The target high pressure is determined with reference to a control map pre-stored in the controller 80 based on the temperature of the high-pressure side refrigerant discharged from the compressor 26 and the outside air temperature Tam.

The refrigerant circulation device 123 is a device to be cooled by the refrigerant circulating therethrough. The low-pressure refrigerant decompressed by the electric expansion valve 122 circulates through the inside of the refrigerant circulation device 123.

Examples of the refrigerant circulation device 123 can include a rear cooler, a battery heat exchanger, and a cooler box.

The rear cooler is an air cooling heat exchanger that cools the air to be blown toward the rear side of the vehicle interior. The battery heat exchanger is a battery cooler that cools the battery mounted on the vehicle. The cooler box is a refrigerator that cools goods stored therein.

The electric expansion valve 122, the refrigerant circulation device 123, and the pressure regulating valve 124 are arranged in parallel with the expansion valve 28 and the chiller 21 with respect to the refrigerant flow.

In this embodiment, the cooler-side valve 120 switches the flow of the coolant among the coolant outlet side of the cooler core 22, the coolant inlet side of the chiller 21, the coolant outlet side of the engine radiator 32, the coolant inlet side of the engine 31, and the coolant outlet side of the radiator bypass flow path 35.

With this arrangement, the thermostat 37 in the above-mentioned embodiment can be integrated with the cooler-side valve 120, which can simplify the whole structure of the thermal management system.

Fifth Embodiment

Figure 17:
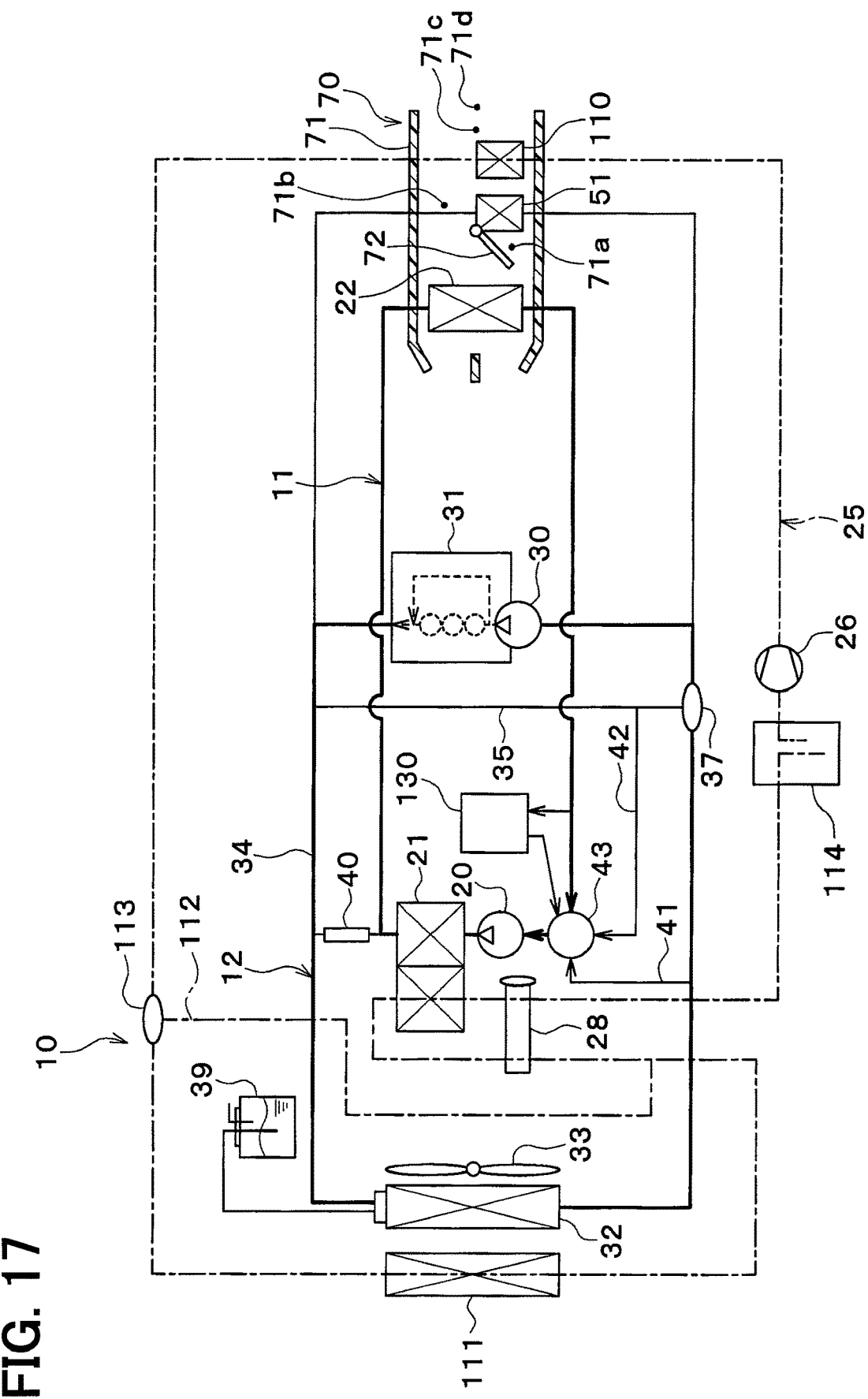
FIG. 17 is an entire configuration diagram of a vehicle thermal management system in a fifth embodiment of the present disclosure.

In this embodiment, as shown in FIG. 17, a cold accumulator 130 is disposed in the cooler cooling circuit 11.

The cold accumulator 130 is a cold accumulator (cold storing device) that stores cold heat held in the coolant. For example, the cold accumulator 130 has a coolant tank that stores therein the coolant. The cold accumulator 130 may have a latent heat type cold storage material. Specifically, the latent heat type cold storage material is a paraffin or a hydrate that has a freezing point adjusted within a range of 0 to 10° C. The cold accumulator 130 may have a material with a large specific heat.

In an example shown in FIG. 17, the cooler-side valve 43 switches between the circulation and blocking of the coolant into the cold accumulator 130. Therefore, in the example of FIG. 17, the cooler-side valve 43 is a five-way valve that has five ports.

A valve separately provided from the cooler-side valve 43 may switch between the circulation and interruption of the coolant into the cold accumulator 130.

For example, during the normal air-cooling, the coolant is circulated to the cold accumulator 130 to store the cold heat, while during the quick air-cooling (during cooling down), the circulation of the coolant to the cold accumulator 130 is interrupted not to store the cold heat.

Other Embodiments

The above-mentioned embodiments can be appropriately combined together. For example, various modifications and changes can be made to the above-mentioned embodiments in the following way.

In the above-mentioned respective embodiments, the coolant is used as the heat medium that passes through the cooler cooling circuit 11, the engine cooling circuit 12, the condenser circuit 13, and the radiator circuit 14. Alternatively or additionally, various kinds of media, including oil, may be used as the heat medium.

Alternatively, a nanofluid may be used as the heat medium. The nanofluid is a fluid that contains nanoparticles having a diameter of the order of nanometer. By mixing the nanoparticles into the heat medium, the following functions and effects can be obtained, in addition to the function and effect of decreasing a freezing point, like a coolant (so-called antifreeze) using ethylene glycol.

That is, the use of the nanoparticles can have the functions and effects of improving the thermal conductivity in a specific temperature range, increasing the thermal capacity of the heat medium, preventing the corrosion of a metal pipe and the degradation in a rubber pipe, and enhancing the fluidity of the heat medium at an ultralow temperature.

These functions and effects vary depending on the configuration, shape, and blending ratio of the nanoparticles, and additive material thereto.

Thus, the mixture of nanoparticles in the heat medium can improve its thermal conductivity, and thus even in a small amount, can exhibit substantially the same cooling efficiency, compared with the coolant using ethylene glycol.

Further, since the thermal capacity of the heat medium can be increased, a cold storage heat amount (stored cold heat due to its sensible heat) of the heat medium itself can be increased.

By increasing the cold storage amount, the temperature adjustment, including cooling and heating, of the device can be performed using the cold heat storage for some period of time even though the compressor 26 is not operated, thereby saving the power of the vehicle thermal management system 10.

An aspect ratio of the nanoparticle is preferably 50 or more. This is because such an aspect ratio can achieve the adequate thermal conductivity. Note that the aspect ratio of the nanoparticle is a shape index indicating the ratio of the width to the height of the nanoparticle.

Nanoparticles suitable for use include any one of Au, Ag, Cu, and C. Specifically, examples of the atom configuring the nanoparticles can include an Au nanoparticle, an Ag nanowire, a carbon nanotube (CNT), a graphene, a graphite core-shell nanoparticle (a particle body with the above-mentioned atom surrounded by a structure, such as a carbon nanotube), an Au nanoparticle-containing CNT, and the like.

In the refrigeration cycle 25 of the above-mentioned embodiments, a fluorocarbon refrigerant is used as the refrigerant. However, the kind of refrigerant in use is not limited thereto and may be natural refrigerant, such as carbon dioxide, a hydrocarbon refrigerant, and the like.

The cooler-side valves 43 and 120 and the engine-radiator flow regulating valve 107 may serve as an engine-radiator flow-rate adjuster.

The refrigeration cycle 25 in each of the above-mentioned embodiments constitutes a subcritical refrigeration cycle in which its high-pressure side refrigerant pressure does not exceed the critical pressure of the refrigerant, but may constitute a super-critical refrigeration cycle in which its high-pressure side refrigerant pressure exceeds the critical pressure of the refrigerant.

The present disclosure is described in accordance with examples. However, it is to be understood that the present disclosure is not limited to these examples or embodiments or their structures described above. The present disclosure includes various modified examples and modifications equivalent thereto. In addition, a variety of combinations or forms of these examples or embodiments, and other combinations or forms obtained by further adding or removing only one or more elements to or from the aforesaid individual examples, embodiments, or combinations also fall within the scope and idea of the present disclosure.

What is claimed is:

1. A thermal management system for a vehicle, comprising:
    a compressor that draws and discharges a refrigerant in a refrigeration cycle;
    an air heater that heats air to be blown into a vehicle interior by using heat of a high-pressure side refrigerant in the refrigeration cycle;
    a chiller that cools a heat medium by exchanging heat between a low-pressure side refrigerant in the refrigeration cycle and the heat medium;
    a cooler core that cools the air by exchanging heat between the air and the heat medium cooled by the chiller;
    a cooler cooling circuit that causes the heat medium to circulate through the chiller and the cooler core;
    a cooler pump that draws and discharges the heat medium in the cooler cooling circuit;
    an engine cooling circuit in which an engine is disposed, the heat medium circulating in the engine cooling circuit circulates through the engine;
    an engine pump that draws and discharges the heat medium in the engine cooling circuit;
    an engine radiator that exchanges heat between the heat medium in the engine cooling circuit and outside air;
    a switching device that switches between an independent mode in which the heat medium circulates respectively independently through the cooler cooling circuit and the engine cooling circuit, and a communication mode in which the cooler cooling circuit and the engine cooling circuit communicate with each other to cause the heat medium to flow between the chiller and the engine radiator; and
    a controller that controls an operation of the switching device to switch to the communication mode when a temperature of the heat medium in the engine cooling circuit is lower than a first heat-medium temperature, wherein
    in the communication mode, the switching device is capable of setting a cooler core communication mode in which the cooler cooling circuit and the engine cooling circuit communicate with each other to cause the heat medium to flow even between the chiller and the cooler core.

2. The thermal management system for a vehicle according to claim 1, wherein
    even if the temperature of the heat medium in the engine cooling circuit is lower than the first heat-medium temperature, the controller controls the operation of the switching device to be in the independent mode, (i) when a volume of the air blowing to the air heater is smaller than a value, (ii) when the air blowing to the air heater is stopped, or (iii) when the air heater does not use heat of the high-pressure side refrigerant.

3. The thermal management system for a vehicle according to claim 1, wherein
the controller controls the operation of the switching device to be in the cooler core communication mode during dehumidifying and air-heating of the vehicle interior in the communication mode, (i) when a difference between a temperature of air blowing from the cooler core and a target cooler-core blowing temperature is less than a predetermined value and the temperature of the air blowing from the air heater is lower than a target heating temperature by a predetermined temperature or more, or (ii) when air-heating performance does not satisfy a predetermined performance.

4. The thermal management system for a vehicle according to claim 3, further comprising:
an engine-radiator flow-rate adjustment device that adjusts a flow rate of the heat medium flowing in the engine radiator; and
a refrigerant flow-rate adjustment device that adjusts a flow rate of the refrigerant flowing through the refrigeration cycle, wherein
the controller controls an operation of the engine-radiator flow-rate adjustment device or the refrigerant flow-rate adjustment device in the cooler core communication mode in such a manner that a temperature in connection with the temperature of the air blowing from the cooler core approaches the first target blowing temperature, and that a temperature in connection with the temperature of the air blowing from the air heater approaches a second target blowing temperature.

5. The thermal management system for a vehicle according to claim 1, wherein
the switching device is capable of communicating the cooler cooling circuit with the engine cooling circuit so as to cause the heat medium to flow between the cooler core and the engine radiator.

6. The thermal management system for a vehicle according to claim 1, wherein
the controller controls the operation of the switching device to switch to the independent mode when a temperature of the heat medium in the engine cooling circuit exceeds a second heat-medium temperature in the communication mode.

7. The thermal management system for a vehicle according to claim 1, further comprising:
a communication flow path that communicates the cooler cooling circuit with the engine cooling circuit in either the independent mode or the communication mode; and
a reserve tank disposed in the engine cooling circuit or the cooler cooling circuit, and adapted to store the heat medium.

8. The thermal management system for a vehicle according to claim 7, wherein
the communication flow path communicates a part of the cooler cooling circuit located on a heat-medium discharge side of the cooler pump and on a heat-medium inlet side of the cooler core with a part of the engine cooling circuit located on a heat-medium discharge side of the engine pump and on a heat-medium inlet side of the engine radiator.

9. The thermal management system for a vehicle according to claim 7, further comprising an engine-radiator flow path that communicates the cooler cooling circuit with the engine cooling circuit, wherein the switching device switches between the independent mode and the communication mode by switching between a state in which the heat medium in the engine cooling circuit flows through the engine-radiator flow path and a state in which the heat medium in the engine cooling circuit does not flow through the engine-radiator flow path.

10. The thermal management system for a vehicle according to claim 1, wherein
the controller stops the compressor while controlling the operation of the switching device such that the heat medium flows between the cooler core and the engine radiator, when the temperature of the heat medium in the engine cooling circuit is lower than a third heat-medium temperature and a temperature of the outside air is lower than a first outside-air temperature.

11. The thermal management system for a vehicle according to claim 1, further comprising:
a radiator bypass flow path that causes the heat medium in the engine cooling circuit to flow while bypassing the engine radiator; and
an engine heat-absorption flow path that connects the radiator bypass flow path to the switching device, wherein
the switching device switches between a state in which the heat medium in the engine cooling circuit flows through the radiator bypass flow path and a state in which the heat medium in the engine cooling circuit does not flow through the radiator bypass flow path.

12. The thermal management system for a vehicle according to claim 11, wherein
the controller controls the operation of the switching device to switch to the state in which the heat medium in the engine cooling circuit flows through the radiator bypass flow path, when a temperature of the outside air is lower than a second outside air temperature.

13. The thermal management system for a vehicle according to claim 1, further comprising:
a request outputting portion that outputs a request for increasing an amount of exhaust heat from the engine, a request for increasing an operating rate of the engine, a request for increasing a temperature of the heat medium in the engine cooling circuit, or a request for reducing the efficiency of the engine, to an engine control unit that controls an operation of the engine; (i) in the communication mode when a refrigerant discharge amount of the compressor is equal to or more than a predetermined amount or the number of revolutions of the compressor is equal to or more than a predetermined value, and when a temperature of the air to be blown into the vehicle interior is lower than a predetermined air temperature; and or (ii) in the communication mode when a temperature of the heat medium flowing through the engine radiator or the chiller is lower than a fourth heat-medium temperature, and when a temperature of the heat medium in the engine cooling circuit is lower than a fifth heat-medium temperature.

14. The thermal management system for a vehicle according to claim 1, wherein
the air heater includes:
a condenser that dissipates heat from the high-pressure side refrigerant into a heater-side heat medium to heat the heater-side heat medium;
a heater core that heats the air by exchanging heat between the heater-side heat medium and the air;

a condenser circuit that causes the heater-side heat medium to circulate through the condenser and the heater core;

a heater pump that draws and discharges the heater-side heat medium in the condenser circuit;

a heat transfer device that heats the heater-side heat medium by transferring heat of the heat medium in the engine cooling circuit into the heater-side heat medium; and a heater-side switching device that selectively causes either the heater-side heat medium heated by the condenser or the heater-side heat medium heated by the heat transfer device to flow into the heater core, wherein the controller controls an operation of the heater-side switching device such that the heater-side heat medium heated by the condenser flows into the heater core in the communication mode, and the controller controls the operation of the heater-side switching device such that the heater-side heat medium heated by the heat transfer device flows into the heater core when a temperature of the heat medium in the engine cooling circuit is equal to or higher than a fifth heat-medium temperature in the communication mode.

15. The thermal management system for a vehicle according to claim 14, wherein
the heat transfer device is a heat-medium heat exchanger that exchanges heat between the heat medium in the engine cooling circuit and the heater-side heat medium.

16. The thermal management system for a vehicle according to claim 15, further comprising:
a heater-side radiator that exchanges heat between the heater-side heat medium and the outside air;
a radiator circuit that causes the heater-side heat medium to circulate through the heater-side radiator; and
a radiator pump that draws and discharges the heater-side heat medium in the radiator circuit, wherein
the heater-side switching device switches between a state in which the heater-side heat medium circulates independently through the condenser circuit and the radiator circuit, and a state in which the condenser circuit and the radiator circuit communicate with each other so as to cause the heater-side heat medium to flow between the condenser and the heater-side radiator.

17. The thermal management system for a vehicle according to claim 1, wherein
the air heater has an interior condenser that heats the air by exchanging heat between the high-pressure side refrigerant and the air.

18. The thermal management system for a vehicle according to claim 17, further comprising:
an exterior condenser that exchanges heat between the high-pressure side refrigerant and the outside air; and
a refrigerant flow-rate ratio adjustment device that adjusts a ratio of a flow rate of the high-pressure side refrigerant flowing through the interior condenser to a flow rate of the high-pressure side refrigerant flowing through the exterior condenser.

19. The thermal management system for a vehicle according to claim 1, further comprising:
a radiator bypass flow path that causes the heat medium in the engine cooling circuit to flow while bypassing the engine radiator, wherein
the switching device switches a flow of the heat medium among a heat-medium outlet side of the cooler core, a heat-medium inlet side of the chiller, a heat-medium outlet side of the engine radiator, a heat-medium inlet side of the engine, and a heat-medium outlet side of the radiator bypass flow path.

20. A thermal management system for a vehicle, comprising:
a compressor that draws and discharges a refrigerant in a refrigeration cycle;
an air heater that heats air to be blown into a vehicle interior by using heat of a high-pressure side refrigerant in the refrigeration cycle;
a chiller that cools a heat medium by exchanging heat between a low-pressure side refrigerant in the refrigeration cycle and the heat medium;
a cooler core that cools the air by exchanging heat between the air and the heat medium cooled by the chiller;
a cooler cooling circuit that causes the heat medium to circulate through the chiller and the cooler core;
a cooler pump that draws and discharges the heat medium in the cooler cooling circuit;
an engine cooling circuit in which an engine is disposed, the heat medium circulating in the engine cooling circuit circulates through the engine;
an engine pump that draws and discharges the heat medium in the engine cooling circuit;
an engine radiator that exchanges heat between the heat medium in the engine cooling circuit and outside air;
a switching device that switches between an independent mode in which the heat medium circulates respectively independently through the cooler cooling circuit and the engine cooling circuit, and a communication mode in which the cooler cooling circuit and the engine cooling circuit communicate with each other to cause the heat medium to flow between the chiller and the engine radiator; and
a controller that controls an operation of the switching device to switch to the communication mode when a temperature of the heat medium in the engine cooling circuit is lower than a first heat-medium temperature, wherein
the switching device is capable of communicating the cooler cooling circuit with the engine cooling circuit so as to cause the heat medium to flow between the cooler core and the engine radiator.

* * * * *